US012591548B2

(12) United States Patent
Hughes et al.

(10) Patent No.: US 12,591,548 B2
(45) Date of Patent: *Mar. 31, 2026

(54) AGGREGATING METRICS IN FILE SYSTEMS USING STRUCTURED JOURNALS

(71) Applicant: Rubrik, Inc., Palo Alto, CA (US)

(72) Inventors: Jeffrey Hughes, Seattle, WA (US); Daniel Hefenbrock, Palo Alto, CA (US); Triantaphyllos Rakitzis, Seattle, WA (US)

(73) Assignee: Rubrik, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/528,613

(22) Filed: Dec. 4, 2023

(65) Prior Publication Data

US 2024/0104063 A1      Mar. 28, 2024

Related U.S. Application Data

(63) Continuation of application No. 17/358,748, filed on Jun. 25, 2021, now Pat. No. 11,853,264.

(60) Provisional application No. 63/045,755, filed on Jun. 29, 2020.

(51) Int. Cl.
| | |
|---|---|
| *G06F 16/10* | (2019.01) |
| *G06F 16/13* | (2019.01) |
| *G06F 16/14* | (2019.01) |
| *G06F 16/17* | (2019.01) |
| *G06F 16/18* | (2019.01) |

(52) U.S. Cl.
CPC ........ *G06F 16/1815* (2019.01); *G06F 16/134* (2019.01); *G06F 16/148* (2019.01); *G06F 16/1734* (2019.01)

(58) Field of Classification Search
CPC .............. G06F 16/1815; G06F 16/148; G06F 16/1734; G06F 16/134
USPC ................................ 707/610, 614, 626, 636
See application file for complete search history.

(56) References Cited

U.S. PATENT DOCUMENTS

| | | | |
|---|---|---|---|
| 7,613,752 | B2 | 11/2009 | Prahlad et al. |
| 7,647,329 | B1 | 1/2010 | Fischman et al. |
| 7,716,180 | B2 | 5/2010 | Vermeulen et al. |
| 7,778,972 | B1 | 8/2010 | Cormie et al. |

(Continued)

OTHER PUBLICATIONS

Abdennur et al., Cooler: scalable storage for Hi-C data and other genomically labeled arrays; Bioinformatics: Jul. 10, 2019.*

(Continued)

*Primary Examiner* — Daniel A Kuddus
(74) *Attorney, Agent, or Firm* — Holland & Hart LLP

(57) ABSTRACT

Embodiments are directed to managing file systems. Update information associated with a change of a metric associated with a target object may be provided. A journal that includes a base bin that includes base records that associate the metric with each object in the file system. Records that include the change of the metric associated with the ancestors of target object may be generated. Another record that includes the change of the metric associated with the target object may be generated. A level bin associated with the base bin of the journal may be provided based on the update information. The records may be stored in the level bin using a sort order based on the ordering of the base bin records. In response a query, the journal may be employed to reduce latency in generating query results.

20 Claims, 15 Drawing Sheets

(56)                References Cited

U.S. PATENT DOCUMENTS

|  |  |  |  |  |
|---|---|---|---|---|
| 7,849,059 | B2 * | 12/2010 | Prahlad | G06F 16/148 |
|  |  |  |  | 707/648 |
| 8,131,725 | B2 * | 3/2012 | Prahlad | G06F 11/1466 |
|  |  |  |  | 707/739 |
| 8,185,497 | B2 | 5/2012 | Vermeulen et al. | |
| 8,589,574 | B1 | 11/2013 | Cormie et al. | |
| 9,166,863 | B2 | 10/2015 | Vermeulen et al. | |
| 9,838,240 | B1 | 12/2017 | Cormie et al. | |
| 10,210,190 | B1 * | 2/2019 | Long | G06F 16/22 |
| 10,346,762 | B2 * | 7/2019 | Greenspan | G06N 3/0464 |
| 10,432,721 | B2 | 10/2019 | Vermeulen et al. | |
| 10,552,468 | B2 * | 2/2020 | Ciulla | G06F 16/353 |
| 10,628,263 | B1 * | 4/2020 | Cowen | G06F 11/1435 |
| 10,652,076 | B2 | 5/2020 | Cormie et al. | |
| 2004/0103105 | A1 | 5/2004 | Lindblad et al. | |
| 2004/0162834 | A1 | 8/2004 | Aono et al. | |
| 2007/0198612 | A1 | 8/2007 | Prahlad et al. | |
| 2010/0131564 | A1 | 5/2010 | Pettovello | |
| 2010/0283221 | A1 * | 11/2010 | Yeh | B62K 15/006 |
|  |  |  |  | 280/287 |
| 2013/0173632 | A1 * | 7/2013 | Birdwell | G06F 16/2246 |
|  |  |  |  | 707/743 |
| 2013/0226966 | A1 | 8/2013 | Shmueli et al. | |
| 2015/0317344 | A1 * | 11/2015 | Birdwell | G06F 16/24578 |
|  |  |  |  | 707/797 |
| 2016/0210200 | A1 * | 7/2016 | Kumarasamy | G06F 3/0619 |
| 2016/0371296 | A1 * | 12/2016 | Passey | G06F 16/185 |
| 2017/0359238 | A1 * | 12/2017 | Hughes | G06F 16/284 |
| 2018/0089328 | A1 | 3/2018 | Bath et al. | |
| 2018/0121539 | A1 * | 5/2018 | Ciulla | G06F 16/3344 |
| 2018/0124174 | A1 * | 5/2018 | Swallow | H04L 67/1095 |
| 2020/0201826 | A1 * | 6/2020 | Raju | G06F 16/1774 |

OTHER PUBLICATIONS

Hua et al., Sane: Semantic-Aware Namespace in Ultra-Large-Scale File Systems; IEEE 2014.*
Abdennur et al., Cooler: scalable storage for Hi-C data and other genomically labeled arrays; Oxford University Press, 2019.*

* cited by examiner

*103*
*104*
*100*
*Mobile Computer*
*Laptop Computer*
*105*
*102*
*108*
*Tablet Computer*
*WIRELESS NETWORK*
*Client Computer*
*WIDE AREA NETWORK / LOCAL AREA NETWORK - (NETWORK)*
*110*
*116*
*118*
*Application Server Computer*
*File System Management Server Computer*

600

| ID | Path-Key | Metric_0 | .... | Metric_n-1 |
|---|---|---|---|---|
| 0 | 1-A | 1784 | .... | 180621 |
| 1 | 2-A\|B | 583 | .... | 17632 |
| 2 | 2-A\|C | 337 | .... | 34222 |
| 3 | 3-A\|B\|a | 16 | .... | 3443 |
| 4 | 3-A\|B\|b | 63 | .... | 435 |
| 5 | 3-A\|B\|c | 108 | .... | 6788 |
| 6 | 3-A\|B\|D | 214 | .... | 1983 |
| 7 | 3-A\|C\|d | 54 | .... | 932 |
| 8 | 3-A\|C\|e | 12 | .... | 776 |
| 9 | 3-A\|C\|f | 7 | .... | 1020 |
| 10 | 3-A\|C\|F | 105 | .... | 62653 |
| 11 | 4-A\|B\|D\|g | 25 | .... | 425 |
| 12 | 4-A\|B\|D\|h | 77 | .... | 547 |
| 13 | 4-A\|B\|D\|i | 48 | .... | 556 |
| 14 | 4-A\|C\|F\|j | 67 | .... | 3433 |
| 15 | 4-A\|C\|F\|k | 4 | .... | 455 |

AGGREGATING METRICS IN FILE SYSTEMS USING STRUCTURED JOURNALS

CROSS-REFERENCE TO RELATED APPLICATION

This patent application is a continuation of U.S. patent application Ser. No. 17/358,748 filed on Jun. 25, 2021, which claims priority to U.S. Provisional Patent Application No. 63/045,755 filed on Jun. 29, 2020, the benefit of the filing date of each of which is hereby claimed under 35 U.S.C. § 119(e) and which is further incorporated in entirety by reference.

TECHNICAL FIELD

The present invention relates generally to data storage, and more particularly, but not exclusively, to managing data storage metrics for file systems.

BACKGROUND

The amount of data generated and retained by modern enterprises continues to increase. This explosion in data has led to larger and larger data storage systems or file systems. In some cases, these data storage systems may include so many data objects or files that maintaining accurate file system metrics or providing results to queries regarding one or more file system metrics may be prohibitively costly at least in terms of time, computing resources, or the like. In particular, providing information that may be based on aggregating various file metrics may disadvantageously require traversing large-scale file systems to individually visit large numbers of distributively stored files. Further, continuous updating of file system metrics may interfere with file system performance. Thus, it is with respect to these considerations and others that the present invention has been made.

SUMMARY

In some examples, a method for managing file systems over a network uses a network computer that performs actions, comprising: providing update information associated with a target object in a file system, wherein the file system includes a plurality of objects, and wherein the update information is associated with a change of a value of a metric associated with the target object; providing a journal based on the update information, wherein the journal includes a base bin that includes one or more base records that associate a separate value of the metric with each object in the file system including the target object, and wherein the one or more base records are ordered based on the file system; determining one or more objects in the file system that are hierarchical ancestors in the file system for the target object based on the update information and the file system; generating one or more records that correspond to the one or more objects, wherein each record includes the change of the value of the metric associated with the target object; generating another record that corresponds to the target object, wherein the other record includes the change of the value of the metric associated with the target object; providing a level bin that is associated with the base bin of the journal based on the update information; storing the one or more records and the other record in the level bin, wherein a sort order of the one or more level bin records in the level bin is based on the ordering of the base bin records in the base bin; and in response to one or more queries, employing the base bin and the one or more level bins in the journal to reduce latency in generating one or more query results.

In some examples, generating the one or more query results, further comprises: determining a base value for each metric associated with the one or more query results based on the base bin; determining one or more partial values for each metric associated with the one or more query results based on the one or more level bins; and generating the one or more query results based on the one or more partial values and the base value.

In some examples, providing the level bin, further comprises, generating a new level bin based on one or more of the update information, an age of the one or more level bins, or a capacity of the one or more level bins.

Some examples further comprise providing a hierarchical index based on the file system; and generating the one or more base records in the base bin based on the hierarchical index.

Some examples further comprise determining one or more partial values associated with one or more changes to the one or more metrics based on one or more level bins in the journal; updating the one or more base records in the base bin based on the one or more partial values; and discarding the one or more level bins.

In some examples, a system for managing file systems over a network is provided. An example system comprises one or more network computers, comprising: a transceiver that communicates over the network; a memory that is arranged to store at least instructions; and one or more processor devices that execute instructions that perform actions, including: providing update information associated with a target object in a file system, wherein the file system includes a plurality of objects, and wherein the update information is associated with a change of a value of a metric associated with the target object; providing a journal based on the update information, wherein the journal includes a base bin that includes one or more base records that associate a separate value of the metric with each object in the file system including the target object, and wherein the one or more base records are ordered based on the file system; determining one or more objects in the file system that are hierarchical ancestors in the file system for the target object based on the update information and the file system; generating one or more records that correspond to the one or more objects, wherein each record includes the change of the value of the metric associated with the target object; generating another record that corresponds to the target object, wherein the other record includes the change of the value of the metric associated with the target object; providing a level bin that is associated with the base bin of the journal based on the update information; storing the one or more records and the other record in the level bin, wherein a sort order of the one or more level bin records in the level bin is based on the ordering of the base bin records in the base bin; and in response to one or more queries, employing the base bin and the one or more level bins in the journal to reduce latency in generating one or more query results; and one or more client computers, comprising: a transceiver that communicates over the network; a memory that is arranged to store at least instructions; and one or more processor devices that execute instructions that perform actions, including: providing the one or more queries.

In some examples, generating the one or more query results, further comprises: determining a base value for each metric associated with the one or more query results based on the base bin; determining one or more partial values for each metric associated with the one or more query results based on the one or more level bins; and generating the one or more query results based on the one or more partial values and the base value.

In some examples, providing the level bin further comprises generating a new level bin based on one or more of the update information, an age of the one or more level bins, or a capacity of the one or more level bins.

In some examples, the one or more processor devices on the network computer execute instructions, further comprising: providing a hierarchical index based on the file system; and generating the one or more base records in the base bin based on the hierarchical index.

In some examples, the one or more processor devices on the network computer execute instructions, further comprising: determining one or more partial values associated with one or more changes to the one or more metrics based on one or more level bins in the journal; updating the one or more base records in the base bin based on the one or more partial values; and discarding the one or more level bins.

In some examples, a network computer is provided for managing file systems over a network. An example network computer comprises: a transceiver that communicates over the network; a memory that is arranged to store at least instructions; and one or more processor devices that execute instructions that perform actions, including: providing update information associated with a target object in a file system, wherein the file system includes a plurality of objects, and wherein the update information is associated with a change of a value of a metric associated with the target object; providing a journal based on the update information, wherein the journal includes a base bin that includes one or more base records that associate a separate value of the metric with each object in the file system including the target object, and wherein the one or more base records are ordered based on the file system; determining one or more objects in the file system that are hierarchical ancestors in the file system for the target object based on the update information and the file system; generating one or more records that correspond to the one or more objects, wherein each record includes the change of the value of the metric associated with the target object; generating another record that corresponds to the target object, wherein the other record includes the change of the value of the metric associated with the target object; providing a level bin that is associated with the base bin of the journal based on the update information; storing the one or more records and the other record in the level bin, wherein a sort order of the one or more level bin records in the level bin is based on the ordering of the base bin records in the base bin; and in response to one or more queries, employing the base bin and the one or more level bins in the journal to reduce latency in generating one or more query results.

In some examples, generating the one or more query results, further comprises: determining a base value for each metric associated with the one or more query results based on the base bin; determining one or more partial values for each metric associated with the one or more query results based on the one or more level bins; and generating the one or more query results based on the one or more partial values and the base value.

In some examples, providing the level bin further comprises generating a new level bin based on one or more of the update information, an age of the one or more level bins, or a capacity of the one or more level bins.

In some examples, the one or more processor devices execute instructions, further comprising: providing a hierarchical index based on the file system; and generating the one or more base records in the base bin based on the hierarchical index.

In some examples, the one or more processor devices execute instructions, further comprising: determining one or more partial values associated with one or more changes to the one or more metrics based on one or more level bins in the journal; updating the one or more base records in the base bin based on the one or more partial values; and discarding the one or more level bins.

In some examples, a processor readable non-transitory storage media includes instructions for managing file systems over a network, wherein execution of the instructions by one or more processor devices performs actions, comprising: providing update information associated with a target object in a file system, wherein the file system includes a plurality of objects, and wherein the update information is associated with a change of a value of a metric associated with the target object; providing a journal based on the update information, wherein the journal includes a base bin that includes one or more base records that associate a separate value of the metric with each object in the file system including the target object, and wherein the one or more base records are ordered based on the file system; determining one or more objects in the file system that are hierarchical ancestors in the file system for the target object based on the update information and the file system; generating one or more records that correspond to the one or more objects, wherein each record includes the change of the value of the metric associated with the target object; generating another record that corresponds to the target object, wherein the other record includes the change of the value of the metric associated with the target object; providing a level bin that is associated with the base bin of the journal based on the update information; storing the one or more records and the other record in the level bin, wherein a sort order of the one or more level bin records in the level bin is based on the ordering of the base bin records in the base bin; and in response to one or more queries, employing the base bin and the one or more level bins in the journal to reduce latency in generating one or more query results.

In some examples, generating the one or more query results, further comprises: determining a base value for each metric associated with the one or more query results based on the base bin; determining one or more partial values for each metric associated with the one or more query results based on the one or more level bins; and generating the one or more query results based on the one or more partial values and the base value.

In some examples, providing the level bin further comprises generating a new level bin based on one or more of the update information, an age of the one or more level bins, or a capacity of the one or more level bins.

Some examples further comprise providing a hierarchical index based on the file system; and generating the one or more base records in the base bin based on the hierarchical index.

Some examples further comprise determining one or more partial values associated with one or more changes to the one or more metrics based on one or more level bins in the journal; updating the one or more base records in the base bin based on the one or more partial values; and discarding the one or more level bins.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein:

FIG. 6 illustrates a logical schematic of a hierarchical index for aggregating metrics in file systems using structured journals in accordance with one or more of the various embodiments;

DETAILED DESCRIPTION OF VARIOUS EMBODIMENTS

Figure 1:
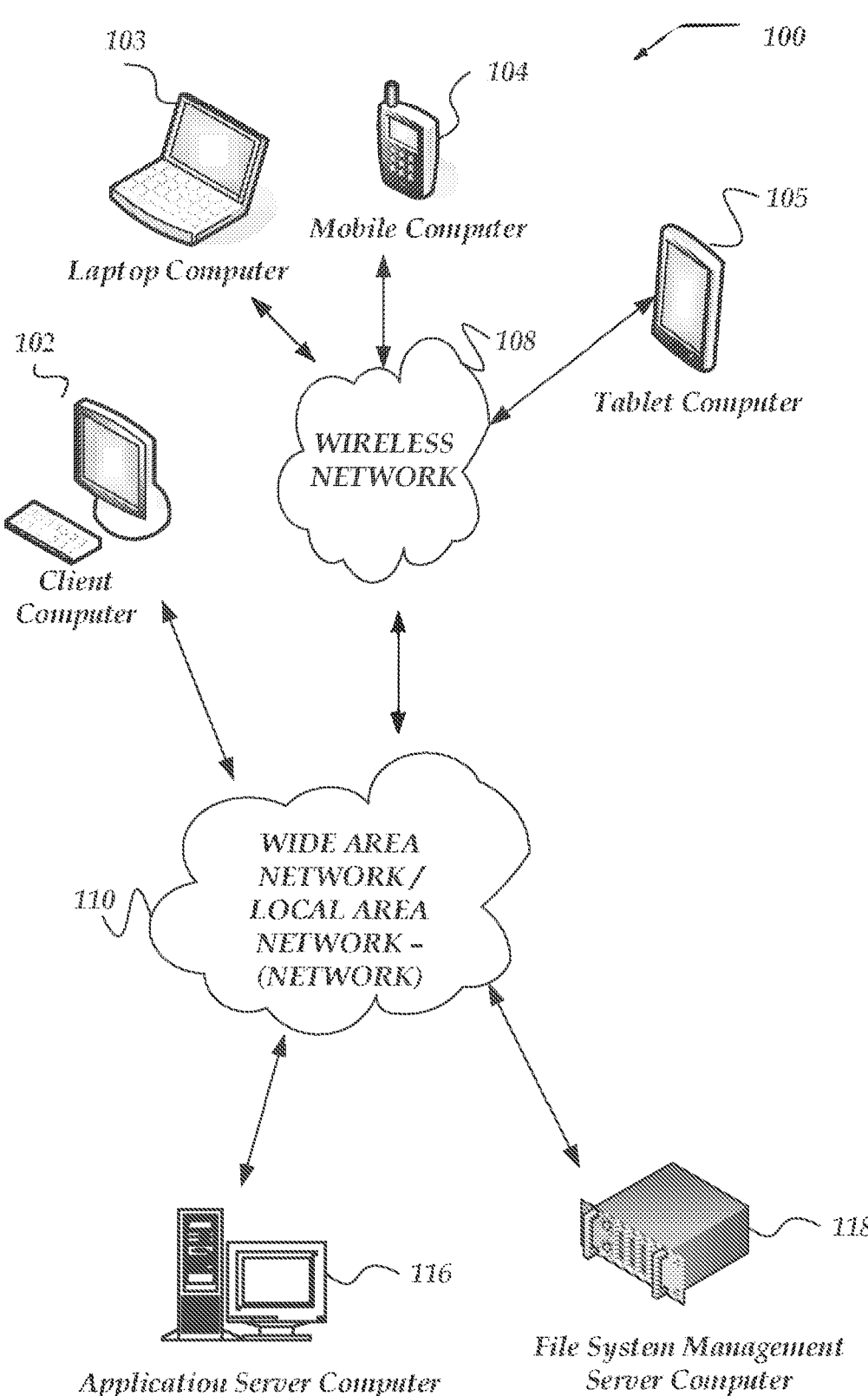
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Go, Java™, PHP, Perl, JavaScript, Ruby, Rust, VB Script, Microsoft .NET™ languages such as C#, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein the terms "file system object," or "object" refer to entities stored in a file system. These may include files, directories, or the like. In this document for brevity and clarity all objects stored in a file system may be referred to as file system objects.

As used herein the term "configuration information" refers to information that may include rule based policies, pattern matching, scripts (e.g., computer readable instructions), or the like, that may be provided from various sources, including, configuration files, databases, user input, built-in defaults, or the like, or combination thereof.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to managing file systems over a network using a network computer.

In one or more of the various embodiments, update information associated with a target object in a file system may be provided such that the file system includes a plurality of objects, and such that the update information may be associated with a change of a value of a metric associated with the target object.

In one or more of the various embodiments, a journal based on the update information may be provided such that the journal includes a base bin that includes one or more base records that associate a separate value of the metric with each object in the file system including the target object, and such that the one or more base records may be ordered based on the file system.

In one or more of the various embodiments, one or more objects in the file system that may be hierarchical ancestors in the file system for the target object may be determined based on the update information and the file system.

In one or more of the various embodiments, one or more records that correspond to the one or more objects may be generated such that each record includes the change of the value of the metric associated with the target object.

In one or more of the various embodiments, another record that corresponds to the target object may be generated such that the other record includes the change of the value of the metric associated with the target object.

In one or more of the various embodiments, a level bin that may be associated with the base bin of the journal may be provided based on the update information. In some embodiments, providing the level bin include, generating a new level bin based on one or more of the update information, an age of the one or more level bins, a capacity of the one or more level bins, or the like.

In one or more of the various embodiments, the one or more records and the other record in the level bin may be stored such that a sort order of the one or more level bin records in the level bin may be based on the ordering of the base bin records in the base bin.

And, in one or more of the various embodiments, un response to one or more queries, the base bin and the one or more level bins in the journal may be employed to reduce latency in generating one or more query results. In some embodiments, generating the one or more query results, may include: determining a base value for each metric associated with the one or more query results based on the base bin; determining one or more partial values for each metric associated with the one or more query results based on the one or more level bins; and generating the one or more query results based on the one or more partial values and the base value.

In one or more of the various embodiments, a hierarchical index based on the file system may be provided. And, in some embodiments, the one or more base records in the base bin may be generated based on the hierarchical index.

In some embodiments, one or more partial values associated with one or more changes to the one or more metrics may be determined based on one or more level bins in the journal. In some embodiments, the one or more base records in the base bin may be updated based on the one or more partial values. And, in some embodiments, the one or more level bins may be discarded.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)—(network) 110, wireless network 108, client computers 102-105, application server computer 116, file system management server computer 118, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CSS), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, application server computer 116, file system management server computer 118, or other computers.

Client computers 102-105 may further be configured to include a client application that enables an end-user to log into an end-user account that may be managed by another computer, such as application server computer 116, file system management server computer 118, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, interactive user-interfaces, or results provided by application server computer 116, file system management server computer 118, network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, application server computer 116, file system management server computer 118, client computers 102, and client computers 103-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

Also, one embodiment of file system management server computer 118 are described in more detail below in conjunction with FIG. 3. Although FIG. 1 illustrates file system management server computer 118, or the like, each as a single computer, the innovations or embodiments are not so limited. For example, one or more functions of file system management server computer 118, or the like, may be distributed across one or more distinct network computers. Moreover, in one or more embodiments, file system management server computer 118 may be implemented using a plurality of network computers. Further, in one or more of the various embodiments, file system management server computer 118, or the like, may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
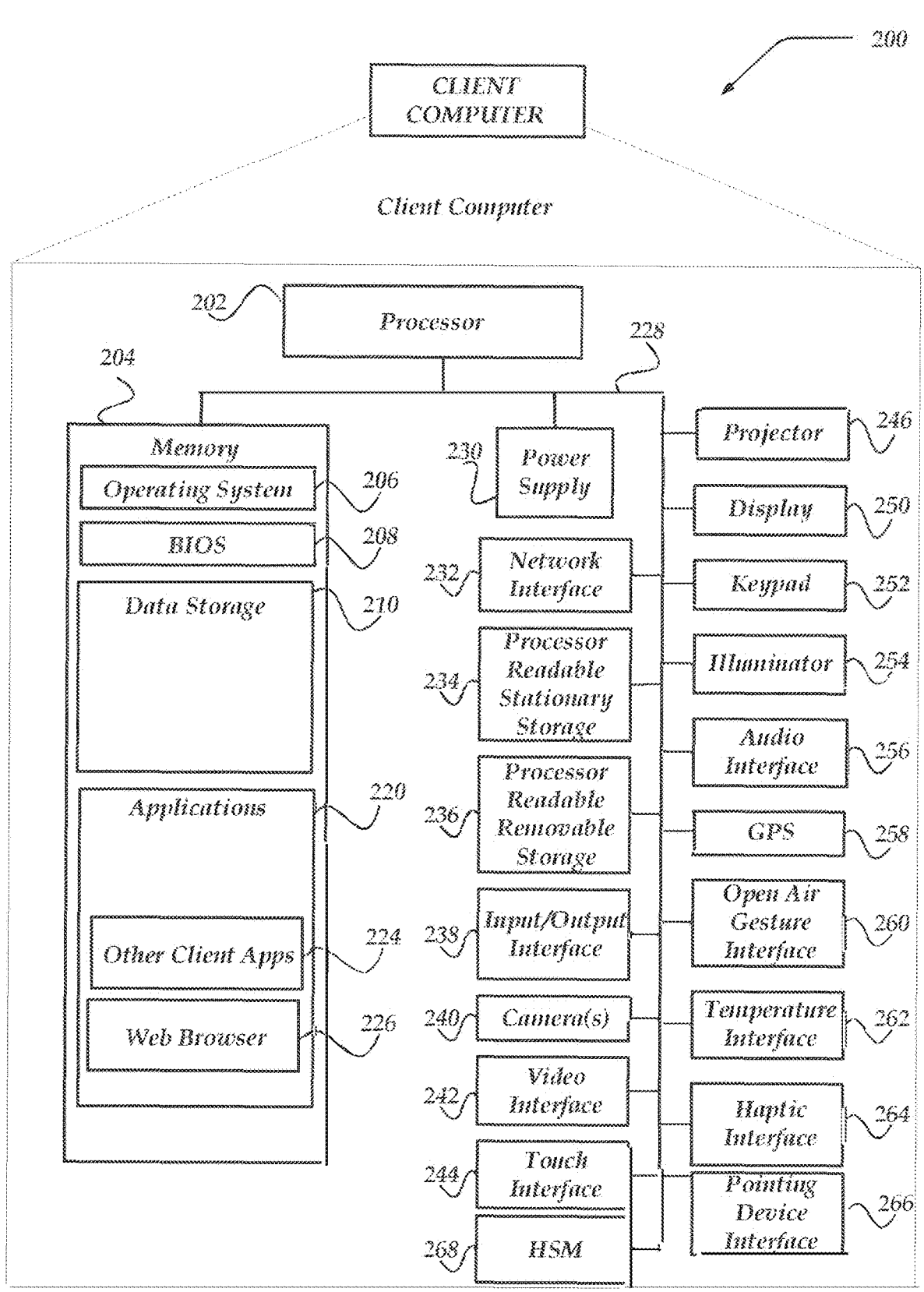
FIG. 2 illustrates a schematic embodiment of a client computer.

FIG. 2 shows one embodiment of client computer 200 that may include many more or less components than those shown. Client computer 200 may represent, for example, one or more embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (MC).

Audio interface 256 may be arranged to produce and receive audio signals such as the sound of a human voice. For example, audio interface 256 may be coupled to a speaker and microphone (not shown) to enable telecommunication with others or generate an audio acknowledgment for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may back-light the buttons on keypad 252 and stay on while the client computer is powered. Also, illuminator 254 may back-light these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, tri-angulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiments, however, client computer 200 may, through other components, provide other information that may be employed to determine a physical location of the client computer, including for example, a Media Access Control (MAC) address, IP address, and the like.

In at least one of the various embodiments, applications, such as, operating system 206, other client apps 224, web browser 226, or the like, may be arranged to employ geo-location information to select one or more localization features, such as, time zones, languages, currencies, calendar formatting, or the like. Localization features may be used in reports, user interfaces, as well as internal processes or databases. In at least one of the various embodiments, geo-location information used for selecting localization information may be provided by GPS 258. Also, in some embodiments, geolocation information may include information provided using one or more geolocation protocols over the networks, such as, wireless network 108 or network 111.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiments, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or LINUX™, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, client user interface engine 222, other client applications 224, web browser 226, or the like. Client computers may be arranged to exchange communications one or more servers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, visualization applications, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 200 may include one or more hardware micro-controllers instead of CPUs. In one or more embodiments, the one or more micro-controllers may directly execute their own embedded logic to perform actions and access its own internal memory and its own external Input and Output Interfaces (e.g., hardware pins or wireless transceivers) to perform actions, such as System On a Chip (SOC), or the like.

Illustrative Network Computer

Figure 3:
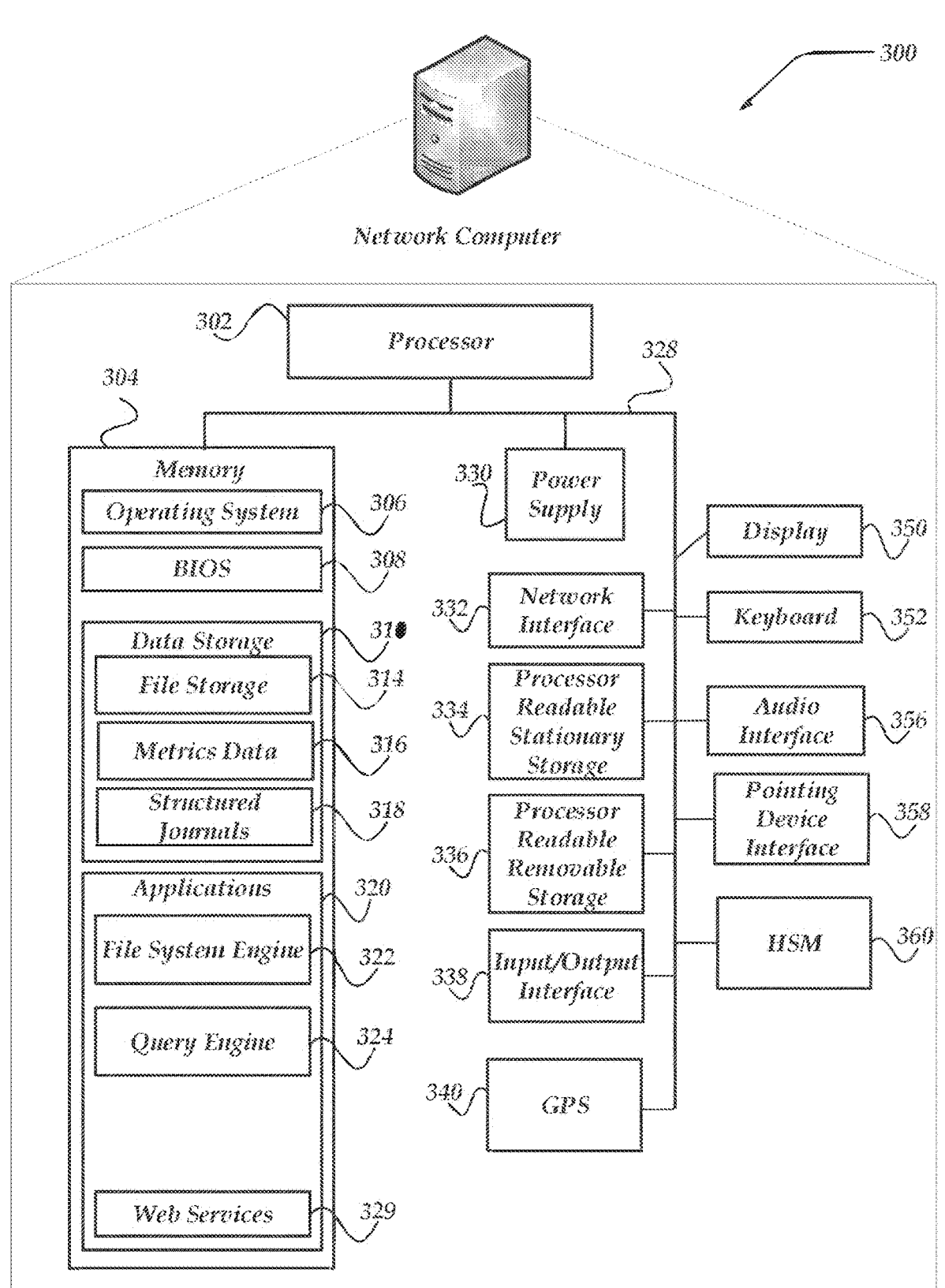
FIG. 3 illustrates a schematic embodiment of a network computer.

FIG. 3 shows one embodiment of network computer 300 that may be included in a system implementing one or more of the various embodiments. Network computer 300 may include many more or less components than those shown in FIG. 3. However, the components shown are sufficient to disclose an illustrative embodiment for practicing these innovations. Network computer 300 may represent, for example, one or more embodiments of a file system management server computer such as file system management server computer 118, or the like, of FIG. 1.

Network computers, such as, network computer 300 may include a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer

300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgment for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiments, however, network computer 300 may, through other components, provide other information that may be employed to determine a physical location of the client computer, including for example, a Media Access Control (MAC) address, IP address, and the like.

In at least one of the various embodiments, applications, such as, operating system 306, file system engine 322, query engine 324, web services 329, or the like, may be arranged to employ geo-location information to select one or more localization features, such as, time zones, languages, currencies, currency formatting, calendar formatting, or the like. Localization features may be used in user interfaces, dashboards, reports, as well as internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or a Linux distribution, or a specialized operating system such as Microsoft Corporation's Windows® operating system, or the Apple Corporation's OSX® operating system. The operating system may include, or interface with one or more virtual machine modules, such as, a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, friend lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, file storage 314, metrics data 316, structured journals 318, or the like.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include file system engine 322, query engine 324, web services 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, file system engine 322, query engine 324, web services 329, or the like, may be operative in a cloud-based computing environment. In one or more of the various embodiments, these applications, and others, that comprise the management platform may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to file system engine 322, query engine 324, web services 329, or the like, may be provisioned and de-commissioned automatically.

Also, in one or more of the various embodiments, file system engine 322, query engine 324, web services 329, or the like, may be located in virtual servers running in a cloud-based computing environment rather than being tied to one or more specific physical network computers.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security module may be employ to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
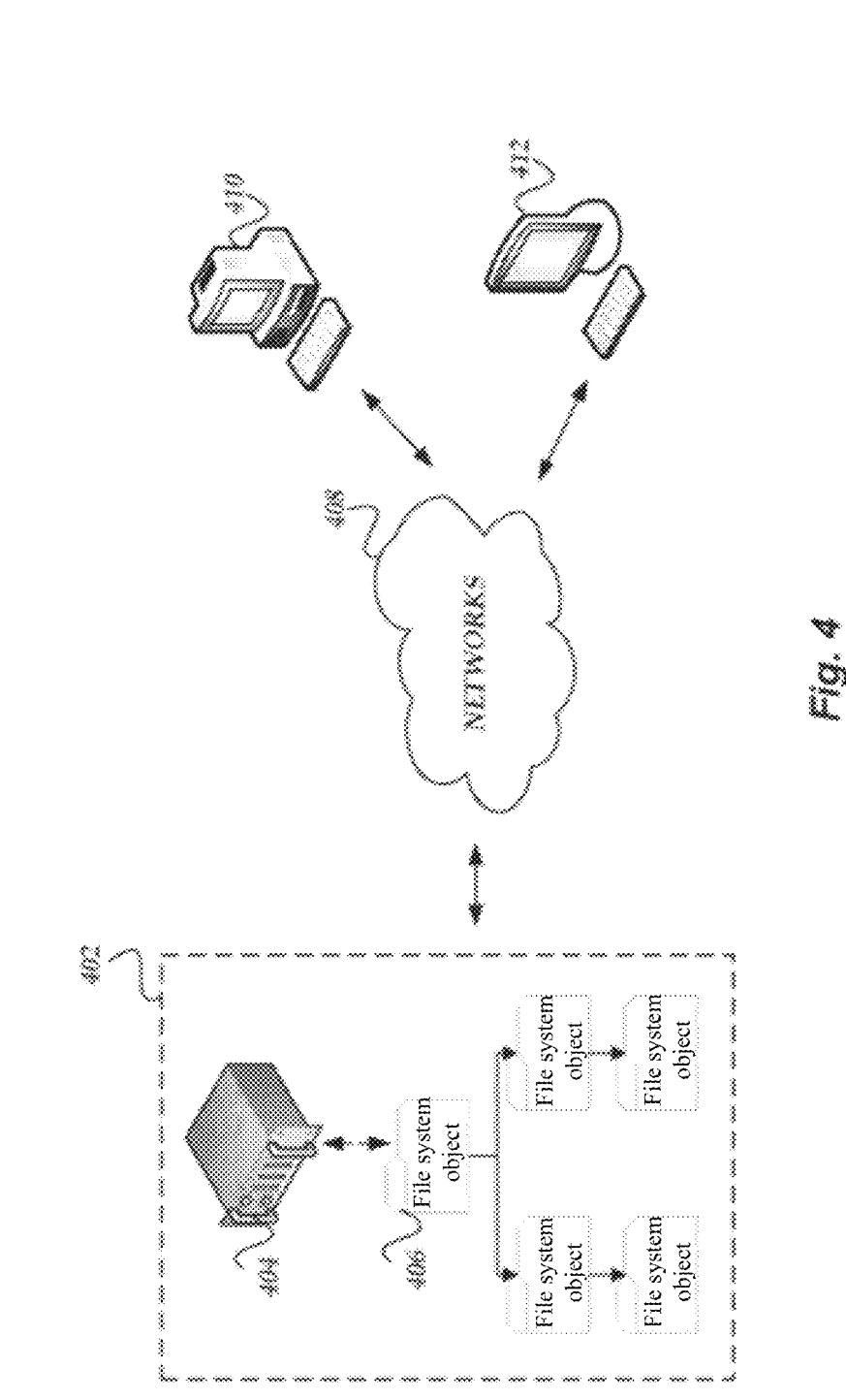
FIG. 4 illustrates a logical architecture of a system for aggregating metrics in file systems using structured journals in accordance with one or more of the various embodiments.

FIG. 4 illustrates a logical architecture of system 400 for aggregating metrics in file systems using structured journals in accordance with one or more of the various embodiments. In one or more of the various embodiments, one or more file systems, such as, file system 402 may be arranged to be communicatively coupled to one or more networks, such as, networks 408. Accordingly, in one or more of the various embodiments, one or more clients, such as, client computer 410 and client computer 412 may be arranged to access file system 402 over networks 408. In some embodiments, clients of file system 402 may include users, services, programs, computers, devices, or the like, that may be enabled to perform one or more file system operations, such as, creating, reading, updating, or deleting data (e.g., file system objects) that may be stored in file system 402. In some embodiments, file system 402 may comprise one or more file system management computers, such as file system management computer 404, or the like. Also, in one or more of the various embodiments, file systems, such as file system 402 may include one or more file system objects, such as file system object 406. In one or more of the various embodiments, file system object 406 may represent the various objects or entities that may be stored in a file system, such as file system 402. In some embodiments, file system objects may include, blocks, files, documents, directories, folders, or the like.

Also, while file system 402 is illustrated as using one file system management computer with one set of file system objects, the innovations are not so limited. Innovations herein contemplate file systems that include one or more file system management computers or one or more file system object data stores. In some embodiments, file system object stores may be located remotely from one or more file system management computers. Also, a logical file system object store or file system may be spread across two or more cloud computing environments, storage clusters, or the like.

Figure 5:
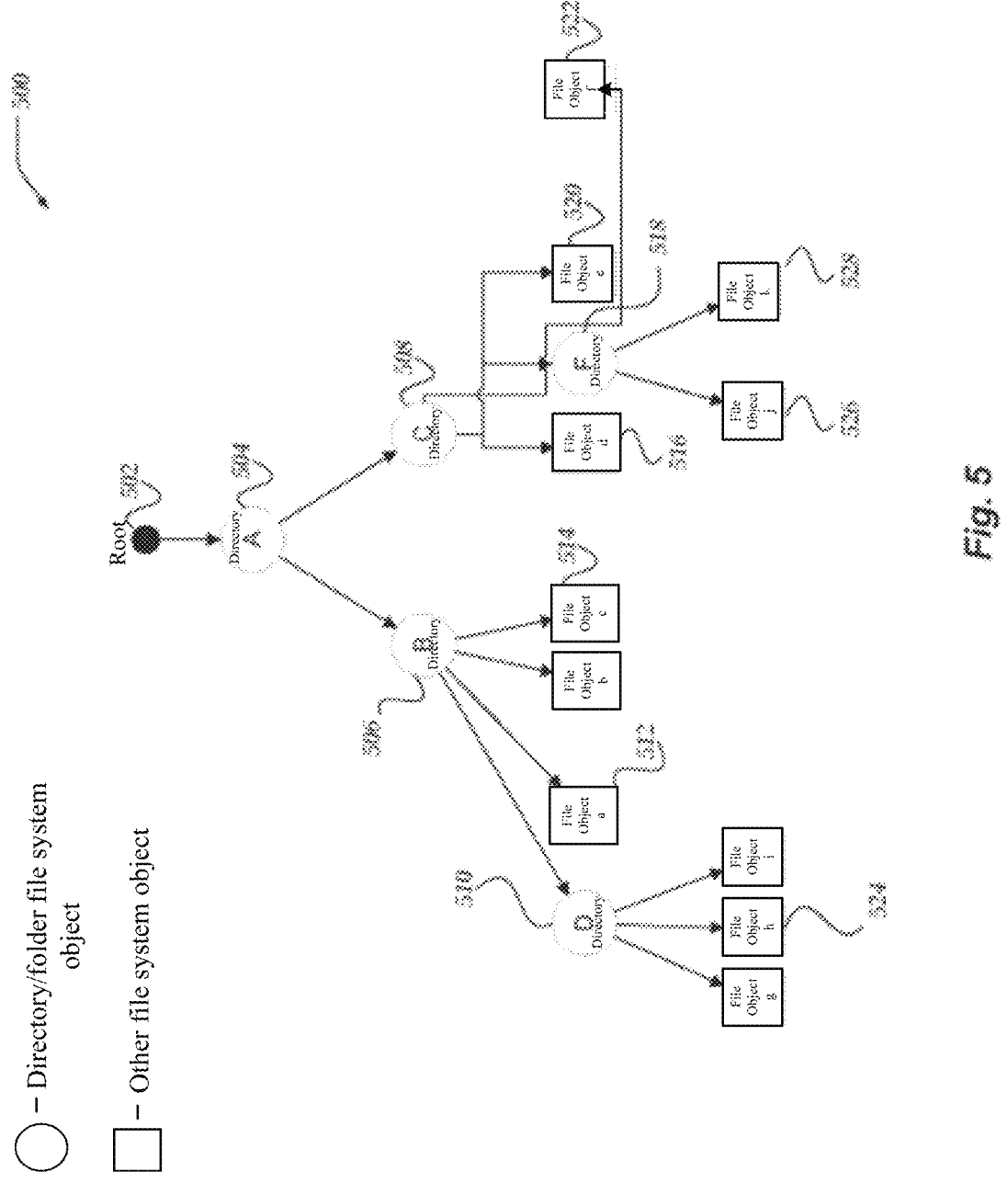
FIG. 5 illustrates a logical representation of a file system for aggregating metrics in file systems using structured journals in accordance with one or more of the various embodiments.

FIG. 5 illustrates a logical representation of file system 500 for aggregating metrics in file systems using structured journals in accordance with one or more of the various embodiments. In this example, for clarity and brevity file system 500 is represented as a tree, in practice, various data structures may be used to store the data that represents the tree-like structure of the file system. Data structures may include tabular formats that include keys, self-referencing fields, child-parent relationships, or the like, to implement tree data structures, such as, graphs, trees, or the like, for managing a file system, such as, file system 500.

In this example, circles are used to illustrate directory/folder file system objects. And, rectangles are used to represent other file system objects, such as, files, documents, or the like. The letter in the center of the file system object represents a name or identifier that may be arranged to reference, locate, or identify a given file system object. In some cases, for some embodiments, one or more file system objects identifier may be chained or concatenated together to form path in the file system that corresponds to an individual file system object. For example, A/B/c may represent a path that identifies or otherwise corresponds to file system object 514.

In this example, for some embodiments, root 502 is the beginning of a portion of a file system. In some embodiments, root 502 is not a file system object per se, rather, it indicates a position in a distributed file system. Directory 504 represents the parent file system object of all the objects under root 502. Directory 504 is the parent of directory 506 and directory 508. Directory 510, file object 512, and file object 514 are children of directory 506; file object 516, directory object 518, file object 520, and file object 522 are direct children of directory 508; file object 524 is a direct child of directory 510; and file object 526 and file object 528 are a direct children of directory 518.

File system 500 may be employed herein as an example file system used to explain and disclose one or more of the innovations associated with aggregating metrics in distributed file systems. Accordingly, some of the following examples or descriptions may refer to file system 500. However, one of ordinary skill in the art will appreciate that production file systems may include different arrangements of file system objects or fewer or more file system objects than shown here in file system 500.

FIG. 6 illustrates a logical schematic of hierarchical index 600 for aggregating metrics in file systems using structured journals in accordance with one or more of the various embodiments. In one or more of the various embodiments, file system engines, such as, file system engine 322 may be arranged to provide or generate one or more hierarchical indices, such as, hierarchical index 600.

In one or more of the various embodiments, hierarchical indices may be arranged to include one or more records that may be associated with file system objects in a file system. In some embodiments, each record in a hierarchical index may include various attributes or metrics, here represented as columns of hierarchical index 600. In this example, for some embodiments, columns may include one or more of: column 602 to represent an identifier attribute for records in hierarchical index 600; column 604 to represent a path-key attribute for a file system object; column 606, for storing values for one or more metrics; one or more other columns, such as, column 608 for storing values for one or more other metrics; or the like.

In one or more of the various embodiments, identifiers, such as those shown in column 602 may be associated with record positions a hierarchical index. For example, in some embodiments, data structures or data stores employed to represent hierarchical index 600 may include columns or indices that include unique values, such as, monotonically increasing integers, GUIDs, hash keys, or the like, that correspond to individual records or rows. In this example, for brevity and clarity, the shown identifier is zero-based record position value that corresponds to the row.

In one or more of the various embodiments, path-key values, such as the information stored in column 604 may be based on the path to an individual file system object. In some embodiments, as shown in this example, a path value may be a compound value based on the level depth of the object and the path to the object. Accordingly, in some embodiments, a hierarchical index may be sorted based on level depth enabling continuous runs of sibling file system objects of a particular path.

In one or more of the various embodiments, metric values, such as the values stored in column 606 or column 608 may represent metric values associated with individual file system objects. For example, metric values may represent one or more characteristics associated with an associated file system object, such as, file size, reference count, block count, or the like.

Accordingly, in this example, for some embodiments, row 610 represents the information for a record that is associated with a file system object associated with the path A/B/a. In this example, row 610 may be considered to correspond to file system object 512 shown in FIG. 5. Likewise, in this example, row 612 may be considered to represent the information for a record that is associated with a file system object associated with the path A/C/F. Accordingly, in this example, row 612 may be considered to correspond to file system object 518 shown in FIG. 5. In this example, for some embodiments, the path-key value at row 610 is prepended with a depth level value of 3 and the path-key value at row 612 is prepended with a depth level of 3 as well.

In one or more of the various embodiments, hierarchical index 600 may be arranged or sorted such that objects at the same depth level are adjacent, and sibling objects are adjacent. For example, from record 3 (e.g., row 610) through record 10 (e.g., row 612), the depth level is 3. Likewise, in this example, from record 3 through record 6 the paths that begin with A|B are adjacent and from record 7 through record 9 the paths that begin with A|C are adjacent.

Note, in some embodiments, file system engines may be arranged to employ one or more compression schemes or encoding schemes to optimize storage or access of the data structures that may comprise hierarchical indices, or the like. Accordingly, in some embodiments, file system engines may be arranged to determine compression schemes or encoding schemes based on rules, instructions, or the like, provided via configuration information. Thus, in some embodiments, organizations may employ configuration information to determine compression schemes or encoding schemes that account for local circumstances, local requirements, or the like.

Figure 7:
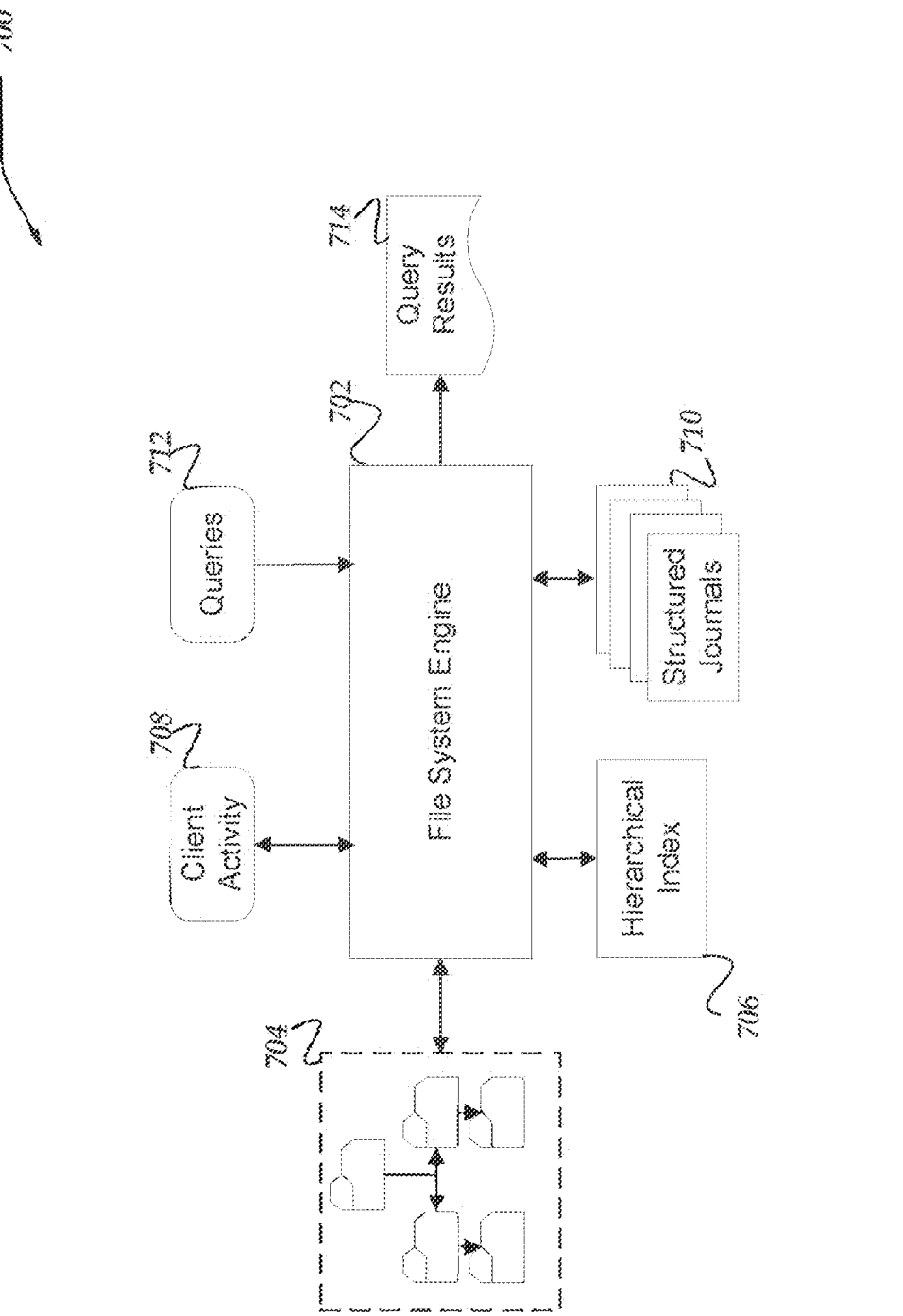
FIG. 7 illustrates a logical schematic of a system for aggregating metrics in file systems using structured journals in accordance with one or more of the various embodiments.

FIG. 7 illustrates a logical schematic of system 700 for aggregating metrics in file systems using structured journals in accordance with one or more of the various embodiments. In one or more of the various embodiments, file system engines may be arranged to support improved management of file system metrics Accordingly, in one or more of the various embodiments, file system engines, such as, file system engine 702 may be arranged manage one or more file systems, such as, file system 704. In some embodiments, this may include generating or providing hierarchical indices, such as, hierarchical index 706, based on the managed file systems, such as, file system 704. And, in one or more of the various embodiments, file system engine 702 may be arranged to employ hierarchical index 706 to generate one or more structured metric journals, such as, structured metric journals 710, or the like.

In one or more of the various embodiments, various file system clients (not shown) may provide or generate various client activity, such as, client activity 708 that may represent activity associated with one or more file system objects. In some embodiments, such activity may include creation, updates, reads, writes, moves, deletion, or the like. In one or more of the various embodiments, file system engines may be arranged to process or execute actions based on the client activity. In some embodiments, file system engines may be arranged to receive client activity information that may be streamed or otherwise provided by other file system engines or file system. Accordingly, in some embodiments, a separate file system or file system engine may be arranged to employ one or more APIs or integration pathways to provide client activity information to file system engine 702. Thus, in some embodiments, innovations disclosed herein may benefit other file systems or other file system engines that may otherwise not include these innovations.

In one or more of the various embodiments, in some high performance or hyper-scale file systems client activity 708 may result in changes to many file system objects. Also, in some embodiments, the affected file system objects may be spread across more than one storage device, storage computer, storage cluster, cache tiers, sub-networks, networks, or the like. Accordingly, in some embodiments, conventional or naive methods for maintaining up-to-date and accurate metric information may be disadvantageous for various reasons.

In some cases, conventional methods for maintaining accurate aggregate block count or aggregate object size metrics may require updating metric values file system object for several file system objects for each a single object that is modified. For example, referring to file system 500, if a client appends 100 blocks to file object 524, the size metrics for the file system object 524, file system object 510, file system object 506, and file system object 504 will be required to be updated. Because, at least for aggregate metrics, the aggregate metrics associated with a file system object's ancestor objects may require updating as well.

In some cases, conventional file systems may delay operation transactions until the metric changes have been committed at the various impacted file system objects. In this example, a client would be required to wait until the metric values for four file system objects (the target file and its ancestors) to be committed before acknowledging that the requested client activity was completed. This may introduce undesirable latency in overall file system performance because of at least the additional time require for actions such as: determining the affected file system objects, locating the metric information for each affected file system object, obtaining thread-safe locks on shared resources used to store the updated metrics, or the like.

Alternatively, in some cases, rather than delaying write or update activity, conventional file systems may compute accurate metric values on demand by employing resource/time intensive scans of large portions of the file system to determine aggregate results for queries. Thus, latency of writes or updates may not be impacted by the bookkeeping actions performed to maintain accurate metrics. However, the collection of metrics may be expensive in time or resources making real-time or near real-time monitoring disadvantageous. Also, in some very large (hyper-scale) systems, generating aggregate metrics on-demand by scanning or traversing file system objects in file system may be practically impossible given the amount of time it may take to traverse some file systems to compute the request metrics.

Further, in one or more of the various embodiments, one or more query providers, such as, query provider 712 may be enabled to provide one or more standard or ad-hoc queries regarding one or more metrics associated with file system 704. In some embodiments, query providers may include client computers, file system clients, applications, operating systems, other services, or the like. In some embodiments, one or more queries or query information may be provided as client activity.

Accordingly, in one or more of the various embodiments, file system engines may be arranged to generate structured metric journals to capture metric update information as it comes in. Also, in some embodiments, structured metric journals may be employed to respond to metric queries as needed.

In this example, query provider 712 may provide queries to file system engine 702. Accordingly, in this example, file system engine 702 may be arranged to employ hierarchical index 706 or structured metric journals 710 to generate query results 714 based on provided queries.

Note, structured metric journals are described in detail below.

Figure 8:
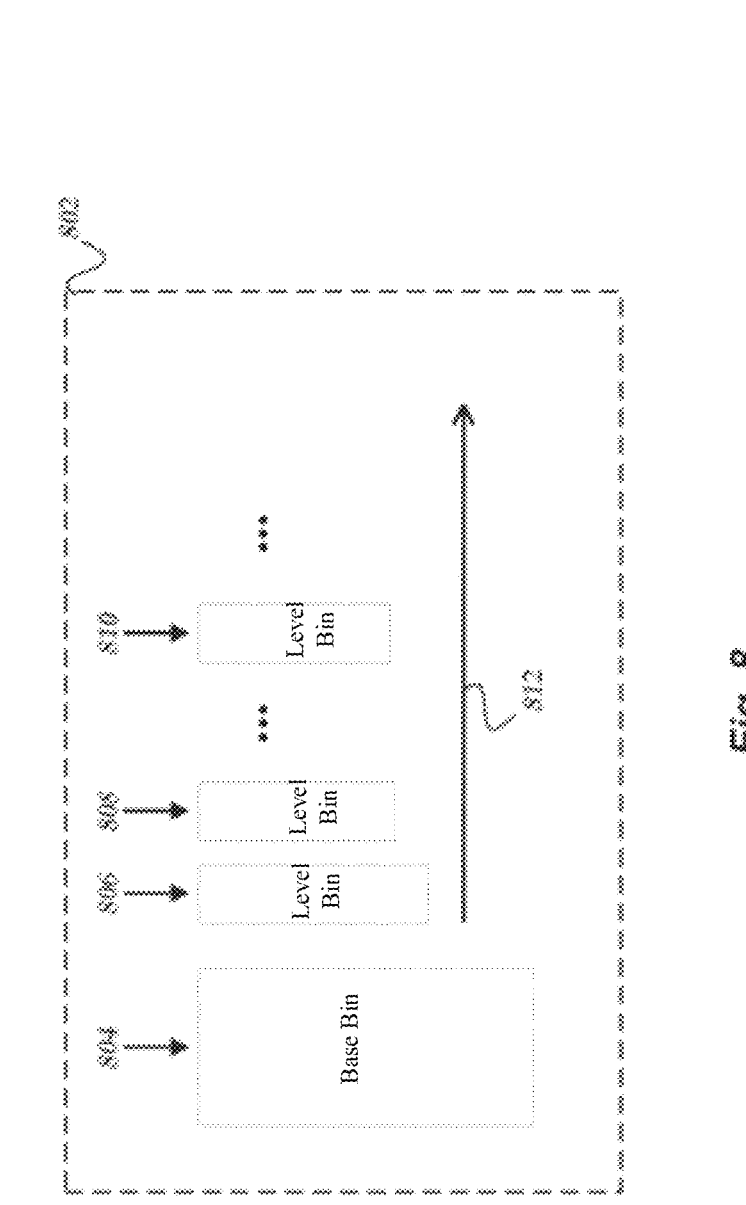
FIG. 8 illustrates a logical schematic of a structured metric journal for aggregating metrics in file systems using structured journals in accordance with one or more of the various embodiments.

FIG. 8 illustrates a logical schematic of structured metric journals 800 for aggregating metrics in file systems using structured journals in accordance with one or more of the various embodiments. In this example, structured metric journal 802 represents a structured metric journal for one or more metrics associated with a file system.

In one or more of the various embodiments, structured metric journals may be comprised of a base bin, such as, base bin 804 that may be data structure that maintains a current baseline value of metrics associated with each file system object. In some embodiments, separate structured metric journals may be provided for each metric (e.g., Metric_0 . . . Metric_n−1 in hierarchical index 600). Thus, in such arrangements, each base bin, such as, base bin may correspond to a single metric, such as, block count, link count, or the like. Alternatively, in some embodiments, structured metric journals may be arranged to represent more than one metric at a time. For example, in one example, a base bin representing all of the metric may be similar to hierarchical index 600. However, for brevity and clarity, structured metric journals may be described as representing a single metric for a file system. However, one of ordinary skill in the art will appreciate that embodiments may include more than one metric in a single structured metric journal. In some embodiments, file system engines may be arranged to employ rules or information provided via configuration information to determine the number of metrics represented by a given structured metric journal to account for local requirements or local circumstances.

In one or more of the various embodiments, in additional to one base bin, such as, base bin 804, structured metric journals may be arranged to include a dynamic or varying number of level bins, such as, level bin 806, level bin 808, or level bin 810.

In one or more of the various embodiments, file system engines may be arranged to generate level bins for a structured metric journal as update information is provided. Note, in this example, ray 812 represents the progression of time.

Accordingly, in one or more of the various embodiments, as update information for one or more file system objects is provided, file system engines may be arranged to generate a new level bin to store records that associate the relevant update information with the affected file system objects. In some embodiments, each record in a level bin represent may store a change information associated with a metric for a file system object. For example, in some embodiments, if 100 blocks are appended to a file object, a file system engine may store a record for each affected in the appropriate level rank. Thus, in some embodiments, level bins may be employed to capture and commit each change to metric.

Further, in one or more of the various embodiments, file system engines may be arranged to apply one or more rules or conditions to determine if a new level rank should be created that may be designated as the current level rank. Accordingly, in some embodiments, file system engines may be arranged to add incoming change information records to the current level bin.

In some embodiments, file system engines may be arranged to generate a new level rank for each incoming update action. Thus, in one or more of the various embodiments, as updates associated with one or more file system objects are provided, a new current level bin may generated for each update.

Also, in some embodiments, file system engines may be arranged to determine if a new current level bin should be generated based on various factors, including, the number of records in a level bin, the number file system objects affected by an update, the age of the current level bin, a running average of the rate of updates, availability of memory resources, or the like.

Further, in some embodiments, file system engines may be arranged to generate a new current level bin if the active current level bin already includes a previously stored record for a file system object associated with an incoming update. Thus, in some embodiments, rather than updating the record in the current level bin, a new current level bin may be generated.

Accordingly, in one or more of the various embodiments, file system engines may be arranged to employ rules, conditions, or instructions provided via configuration information to determine if a new current level bin should be generated to account for local requirements or local circumstances.

In one or more of the various embodiments, the path-key information associated with a file system object update may be employed to rapidly determine the affected file system objects (e.g., the ancestor objects). Accordingly, in one or more of the various embodiments, a file system engine may generate a record for each affected file system object and add it to the active level bin. For example, (referring also to file system 500, in FIG. 500) an update to file system object 526 may include path information, such as, A/C/F/j in a update message such as ['A/C/F/j', block count, +100, . . . ]. In this example, for some embodiments, a file system engine may be arranged to split the path information to identify the affected file system objects. Accordingly, in this example, four records, such as, ['A', +100], ['C', +100], ['F', +100], and ['j', +100] may be added to the current level bin for the structured metric journal associated with block counts.

Further, in one or more of the various embodiments, file system engines may be arranged to merge the level bins in a structured metric journals into the value rank. In some embodiments, file system engines may be arranged to determine if the merge the level bins into the base bin based on various conditions or rules determined from configuration information. For example, in some embodiments, file system engines may be arranged to periodically merge level ranks based on timers, activity level of the file system, size or level count of the structured metric journals, size or record count or level bins, or the like.

In one or more of the various embodiments, merging level bins with a base bin may include combining the metric update information in the level bins with the metric values in the base bin. If the merge is complete, the level bins may be discarded.

In one or more of the various embodiments, file system engines may be arranged to generate structured metric journal data structures in advance. For example, in some embodiments, memory (e.g., arrays, or the like) may be pre-allocated for structured metric journals. Likewise, in one or more of the various embodiments, memory resources for level bins may be reused by marking unused level bins or empty level bin record slots as empty so they may be reused without requiring additional memory allocation.

Figure 9:
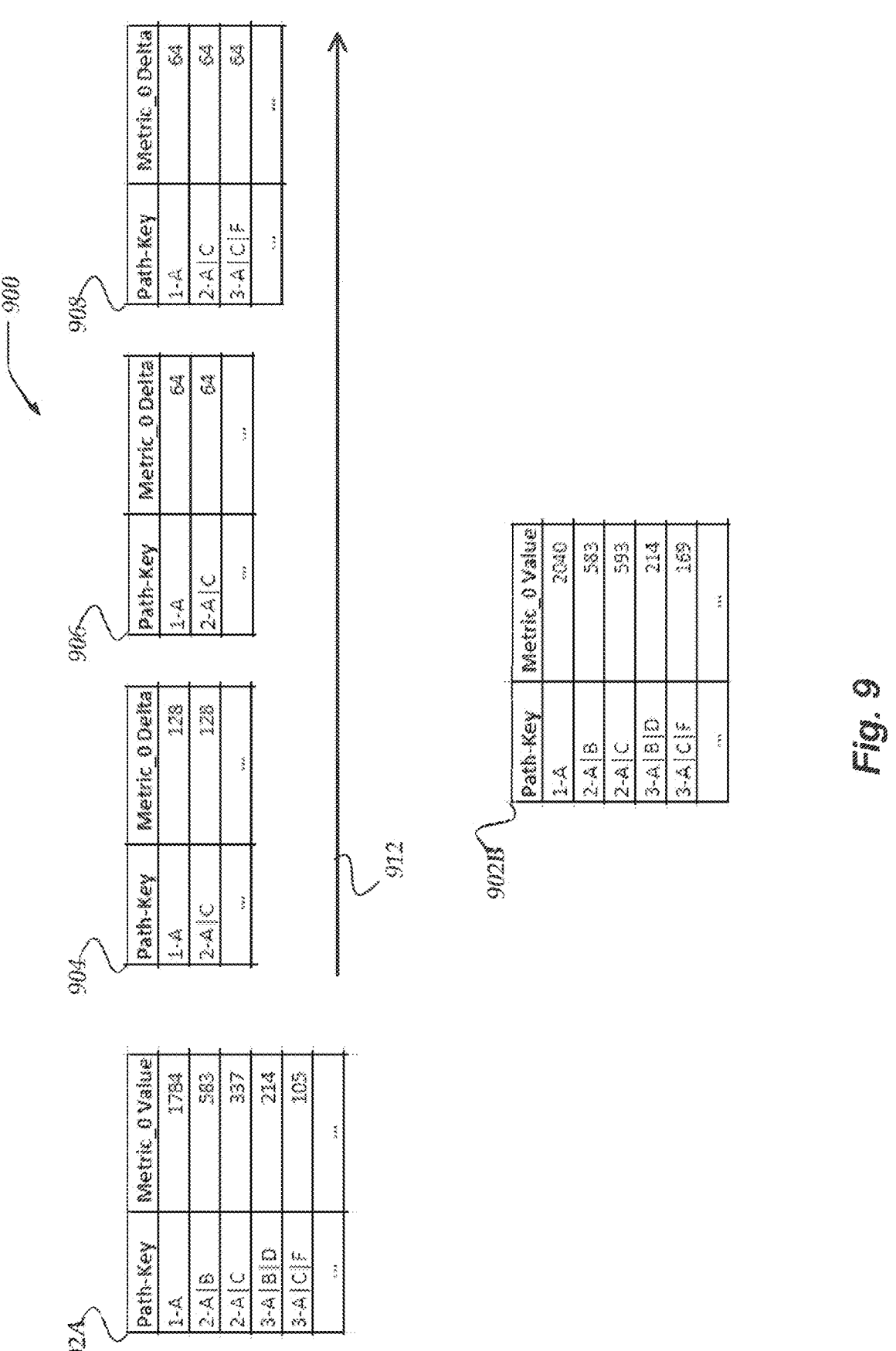
FIG. 9 illustrates a logical schematic of a structured metric journal for aggregating metrics in file systems using structured journals in accordance with one or more of the various embodiments.

FIG. 9 illustrates a logical schematic of structured metric journal 900 for aggregating metrics in file systems using structured journals in accordance with one or more of the various embodiments. This example illustrates how a file system engine may perform actions to employ or generate structured metric journals for capturing metrics that may be associated with various changes or updates to file system objects.

In one or more of the various embodiments, base bin data structures, such as, base bin 902A, may be arranged to track metric values for directory objects. In some embodiments, metrics aggregated at the directory level may be based on updates to file objects. However, in some embodiments, organizations may desire to employ structured metric journals based on metrics associated with directory objects rather than including each file object update in the journals. Accordingly, in some embodiments, records included in structured metric journals may be limited to metric information associated with directory object. However, in some embodiments, while one or more metrics may be tracked at the directory level using structured metric journals one or more other metrics may be tracked at an object or file level (See, FIG. 10). Accordingly, in one or more of the various embodiments, file system engines may be arranged to employ rules or conditions provided via configuration information to determine if metrics may be tracked at the directory object level or file object level to account for local circumstances or local requirements.

In this example, for some embodiments, base bin 902A represents a data structure that includes initial values of metric_0 for directory objects in a file system. In this example, for some embodiments, base bin 902A is arranged to represent metric values for directory objects based on file system 500 in FIG. 5. In some embodiments, base bin records may include a field representing the path-key of an file system object, one or more metric value fields, or the like. In some embodiments, path-key fields may correspond to file system paths associated with file system objects and the associated metric values may represent the value of particular metrics for the file system objects that may correspond to the path-keys.

In one or more of the various embodiments, base bins may be similar to or otherwise based on hierarchical indices. Accordingly, the sort order and path-key values may be the same as a hierarchical index for a file system. Accordingly, because this example is based on file system 500 and hierarchical index 600, base bin 902A has the same path-keys for the directory objects and the same metric_0 values as shown in hierarchical index 600. However, in this example, structured metric journal 900 is arranged to track metrics for directory objects so records associated with file objects are omitted from base bin 902A.

In some embodiments, structured metric journals may be arranged to track more than one metric. Alternatively, in one or more of the various embodiments, file system engines may be arranged to maintain separate structured metric journals for each metric. Also, in one or more of the various embodiments, file system engines may be arranged to combine a portion of metrics in structured metric journals that track more than one metric as well as employing other structured metric journals that track a single metric. However, for brevity and clarity, structured metric journals are illustrated and described herein as tracking a single metric for a file system. Accordingly, one of ordinary skill in the art, will appreciate that file system engines may be arranged to employ rules or conditions provided via configuration information to determine if metrics may be tracked in separate structured metric journals or if more than one metric may be tracked in the same structured metric journal to account for local circumstances or local requirements.

In one or more of the various embodiments, as described above, structured metric journals may be arranged to include a base bin, such as, base bin 902A as well as zero or more level bins, such as, level bin 904, level bin 906, level bin 908, or the like. In one or more of the various embodiments, initially, a structured metric journal may be comprised of just a base bin. As updates to the metric occur, file system engines may be arranged to generate level bins to record the update information.

Further, in one or more of the various embodiments, file system engines may be arranged to periodically or occasionally merge the level bins of a structured metric journal into the base bin of the structured metric journal. In one or more of the various embodiments, the conditions that may trigger merging of the level bins into their base bin may vary depending on local performance requirements or other local considerations. For example, in some embodiments, merge jobs may be added to low priority queues that enable the file system engine to perform the merge operations without interfering with client access to the underlying file system objects. In this example, base bin 902B represents base bin 902A after being merged with level bin 904, level bin 906, and level bin 908 in accordance with one or more of the various embodiments.

In one or more of the various embodiments, as noted above, file system engines may be arranged to generate level bins for a structured metric journal as update information is provided. Note, in this example, ray 912 represents the progression of time.

In one or more of the various embodiments, file system engines may be arranged to determine metrics associated with updates to file system objects based on update information provided to file system engines. In some embodiments, update information may include flags, tags, labels, or the like, that expressly identify the metrics of interest. In other cases, for some embodiments, file system engines may be arranged to infer metrics of interest based on the update information.

As described above, update information may be provided directly to the file system engine via APIs, or the like. In some embodiments, file system engines may be arranged to passively monitor client activity to capture update information associated with metrics.

In this example, for some embodiments, initially base bin 902A may be provided in structured metric journal 900. At a late time, update information associated with directory object C (directory object 508 in FIG. 5) may be provided to the file system. In this example, the update is assumed to add 128 to the value of metric_0. Thus, if metric_0 represents the number of data blocks associated with a file system object, adding 128 to metric_0 for that file system object may represent that a client of file system has added 128 blocks to a file stored in directory C or that a client has created a new file of size 128 blocks in directory C.

In one or more of the various embodiments, in response to being provided update information, file system engines may be arranged to determine a level bin to store the relevant update information. In some embodiments, if the structured metric journal does not have a level bin yet, one may be generated. In this example, level bin 904 may be generated to capture the first change to metric_0.

In one or more of the various embodiments, file system engines may be arranged to determine the path or path-key information associated with the update file system objects based on the update information. For example, if the update information shows that a file object with path '/A/C/d' is being updated, the file system engine may determine based on the path information that file system object 516 in file system 500 has been updated such that 128 is added to metric_0 for file system object 516. Accordingly, in some embodiments, the path information associated with the file system object being updated may be employed to identify the ancestor objects, if any, that may be associated with the file system object being updated. In this example, file d with a path of /A/C/d is being updated. Accordingly, in this example, the ancestor objects associated with file d are its parent object, directory object C and its grand-parent object, directory object A.

In one or more of the various embodiments, updates to file system objects that change aggregate metrics may be affect the value of metrics associated with ancestor file system objects. For example, if directory object C is associated with a block count metric, changes in the block counts of its descendant objects may result in changes to the block count metric associated with directory object C. Likewise, for example, if the parent object of C is associated with an aggregate block count metric, it will also be changed based on changes to the block count of its descendant objects. Thus, in this example, changes to aggregate metrics associated with file d will affect the metric value of file d and its ancestor objects, directory C and directory A.

In one or more of the various embodiments, file system engines may be arranged to generate level bin records that capture the update information for the target object as well as its ancestor objects. In this example, structured metric journal 900 tracks metric_0 for directory objects. Accordingly, in this example, two records may be added to level bin 904 reflecting that a change to metric_0 value for directory object C also changes metric_0 value for its ancestor directory A.

In one or more of the various embodiments, the sort order of records in level bins may be the same as its corresponding base bin or hierarchical index.

Later, in this example, another update is provided. In this case, the update indicates that metric_0 for directory object C is changed again, this time it is increased by 64 instead of 128. Accordingly, in this example, the file system engine may generate another level bin, such as, level bin 906 to store two records that capture the change to metric_0 for directory object C and directory object A.

Still later, in this example, another update is provided. In this case, the update indicates that metric_0 for directory object F (object 518 in FIG. 5) has been changed. Accordingly, the file system engine generates level bin 908 and stores three records capturing the change to metric_0 for directory object F and its ancestor object, directory object C and directory object A.

Eventually, in this example, the file system engine may merge the level bins of structured metric journal 900 back into its base bin, producing base bin 902B which represents base bin 902A after merging the level bins into it.

While this example illustrates updates based on adding values to metrics, other operations may be represented similarly. For example, in some embodiments, if metric_0 is block count, deleting files in a file system may result in level bin records that are less than zero or otherwise represent negative changes or decrements rather than increments. For example, deleting a file having 1000 blocks from the file system may trigger the file system engine to generate level bin records for the target object and each of it ancestor objects that indicate 1000 blocks have been removed. In this example (not shown), if file object 524 (in FIG. 5) is a 1000 block file and update information indicates that file object 524 has been deleted, the file system engine may generate a new level bin and store level bin records indicating 1000 blocks have been removed (−1000) from directory D (directory object 510), 1000 blocks have been removed from directory B (directory object 506), and 1000 blocks have been removed from directory A (directory object 504).

Further, as mentioned above, in some embodiments, the criteria for generating new level bins may vary depending on local circumstances or local requirements. In some embodiments, file system engines may be arranged to generate a new level bin for each update. In some embodiments, update information may include updates for several objects that result in level bin records based on those updates being stored in the same level bin. Also, in some embodiments, level bins may be active or available for a defined time duration. In some embodiments, level bins may be sized or limited based on the number of updates captured such that level bins may be active until they contain a number of level bin records that exceed a threshold value.

As discussed above, employing structured metric journals enable file system engines to accurately or reliably capture changes to aggregate metrics without introducing additional latency that could be caused by reconciling aggregate metrics on the fly. File system engines may be arranged to rapidly write updates to structured metric journals avoiding delays or latency associated with conventional methods, such as, obtaining locks on shared resources used to store metric values, tracing object ancestry, keeping ancestor metrics up to date, or the like.

In one or more of the various embodiments, queries associated with one or more metrics may be provided to file system engines. In some embodiments, queries requests current values of one or more metrics for one or more file system objects. Accordingly, in some embodiments, file system engines may be arranged to employ the same structured metric journals used for capturing changes to metrics to provide results to one or more queries.

For example, a query requesting the current value of metric_0 for directory object A may be provided. Accordingly, in this example, the file system engine may determine the structured metric journal for metric_0. If a structured metric journal for metric_0 is unavailable, the query result may be provided from another source, including hierarchical indexes, such as, hierarchical index 600.

In this example, the file system engine may determine that structured metric journal 900 is associated with metric_0. Accordingly, if the query was provided before level bin 904, level bin 906, or level bin 908 are generated, the file system engine may employ base bin 902A to report that metric_0 for directory object A has a value of 1784.

However, in one or more of the various embodiments, if structured metric journals associated with a metric query have level bins, the level bins may be evaluated as well as the base bin of the structured metric journal to determine query results. In this example, if a query requests the current value for metric_0 for directory object C and level bin 904 is present in structured metric journal 900, the file system engine may report that metric_0 for directory object C is 337+128=465. Similarly, in this example, if level bin 906 and level bin 908 are in structured metric journal 900, the file system engine may report the value for metric_0 is 337+128+64+64=593. As mentioned, for this example, if level bin 904, level bin 906, and level bin 908 have been merged into base bin 902A before the query is provided, the file system engine may employ base bin 902B to provide 593 as the answer to the query.

Thus, in one or more of the various embodiments, file system engines may be arranged to employ the base bin and any level bins that may be in unmerged structured metric journals to answer queries rather than executing a merge before answering the query. In some embodiments, this may be an advantageous improvement that at least avoids introducing delay or latency that may be caused by forcing a merge operation before responding to the query. Further, in some embodiments, these innovations enable accurate and precise results rather than providing estimates or otherwise inaccurate results.

Figure 10:
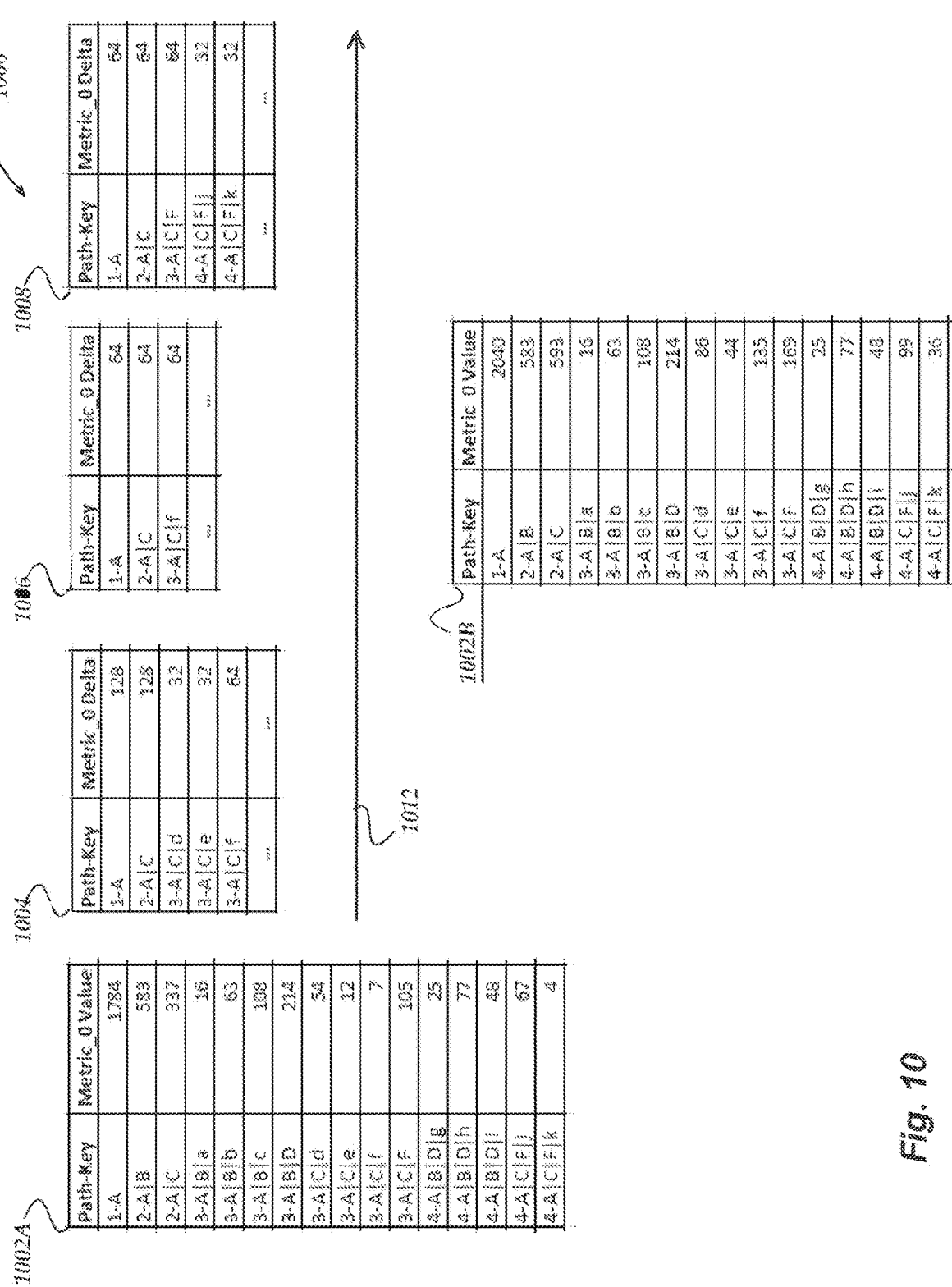
FIG. 10 illustrates a logical schematic of a structured metric journal for aggregating metrics in file systems using structured journals in accordance with one or more of the various embodiments.

FIG. 10 illustrates a logical schematic of structured metric journal 1000 for aggregating metrics in file systems using structured journals in accordance with one or more of the various embodiments. This example illustrates how a file system engine may perform actions to employ or generate structured metric journals for capturing metrics that may be associated with various changes or updates to file system objects. This example is similar to structured metric journal 900 described above except that structured metric journal 1000 is being employed to track metrics at the file object level rather than being limited to tracking metrics at the directory object level. Accordingly, for brevity and clarity many details described above in context with structured metric journal 900 are omitted here. However, one of ordinary skill in the art will appreciate that except where expressly limited to directory objects or file objects that descriptions for structured metric journal 900 may apply to structured metric journal 1000.

In one or more of the various embodiments, as described above, structured metric journals may be arranged to include a base bin, such as, base bin 1002A as well as zero or more level bins, such as, level bin 1004, level bin 1006, level bin 1008, or the like. In one or more of the various embodiments, initially, a structured metric journal may be comprised of just a base bin. As updates to the metric occur, file system engines may be arranged to generate level bins to record the update information.

Also, in this example, base bin 1002B represents base bin 1002A after being merged with level bin 1004, level bin 1006, and level bin 1008 in accordance with one or more of the various embodiments.

In one or more of the various embodiments, as noted above, file system engines may be arranged to generate level bins for a structured metric journal as update information is provided. Note, in this example, ray 1012 represents the progression of time.

In one or more of the various embodiments, structured metric journal may be arranged to track changes to aggregate metrics at the file object level. Accordingly, in some embodiments, base bins, such as, base bin 1002A may include records for each object in the file system. Accordingly, in this example, base bin 1002A and base bin 1002B include records for each object included in file system 500 in FIG. 5.

Generally, in some embodiments, file system engines may be arranged to employ structured metric journal 1000 similarly as described for structured metric journal 900.

However, in this example, level bin 1004 includes metric changes based on updates to three file objects where file d (object 516), file e (object 520), and file f (object 522) have level bin records show changes to metric_0. In this example, this may represent that the three files were updated in the same transaction or batch. Alternatively, the updates associated with the three files may have occurred sequentially or otherwise near in time. As mentioned above, file system engines may be arranged to employ rules or conditions provided via configuration information.

In this example, for some embodiments, a queries may be handled similarly as described above for structured metric journal 900. Accordingly, if a query references or depends on a metric tracked in structured metric journal 1000, results may be based on combining values from base bin 1002A with values from any level bins in the structured metric journal.

Generalized Operations

FIGS. 11-15 represent generalized operations for aggregating metrics in file systems using structured journals in accordance with one or more of the various embodiments. In one or more of the various embodiments, processes 1100, 1200, 1300, 1400, and 1500 described in conjunction with FIGS. 12-15 may be implemented by or executed by one or more processors on a single network computer, such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based environment. However, embodiments are not so limited and various combinations of network computers, client computers, or the like may be utilized. Further, in one or more of the various embodiments, the processes described in conjunction with FIGS. 11-15 may perform one or more actions for aggregating metrics in file systems using structured journals in accordance with at least one of the various embodiments or architectures such as those described in conjunction with FIGS. 4-10. Further, in one or more of the various embodiments, some or all of the actions performed by processes 1100, 1200, 1300, 1400, or 1500 may be executed in part by file system engine 322, query engine 324, or the like.

Figure 11:
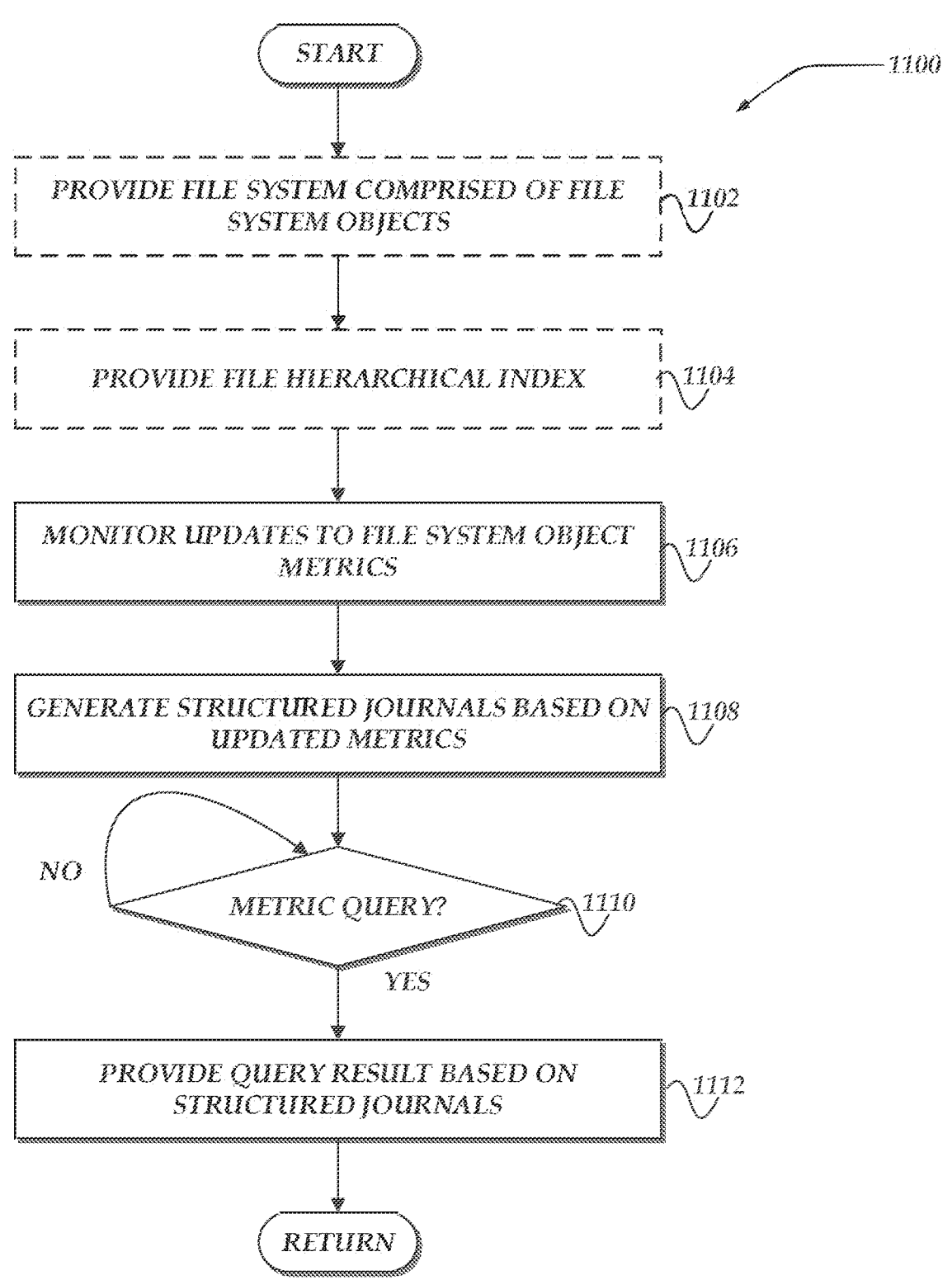
FIG. 11 illustrates an overview flowchart for a process for aggregating metrics in distributed file systems in accordance with one or more of the various embodiments.

FIG. 11 illustrates an overview flowchart for process 1100 for aggregating metrics in distributed file systems in accordance with one or more of the various embodiments. After a start block, at block 1102, in one or more of the various embodiments, optionally, a file system that comprises of a plurality of file system objects may be provided. Alternatively, in some embodiments, a portion of a file system may be provided, such as, one or more sub-trees, sub-directories, segments, shards, or the like, of a larger distributed file system.

Note, this block is marked as optional, because in some embodiments, file system engines may be provided information about a file system or a portion of a file system, such as, meta-data, index information, metric information, or the like, rather than an actual file system or direct access to a file system.

At block 1104, in one or more of the various embodiments, optionally, file system engines may be arranged to provide a hierarchical index. In one or more of the various embodiments, file system engines may be arranged to traverse the file system to generate a hierarchical index that corresponds to the provided file system.

In one or more of the various embodiments, file system engines may be arranged to associate one or more metrics with each hierarchical index record. In some embodiments, the metrics labels/names or metric values may be provided to a file system engine. Alternatively, in some embodiments, file system engines may be arranged to determine one or more metrics during while or as part of generating a hierarchical index. Accordingly, in one or more of the various embodiments, file system engines may be arranged to employ rules, instructions, grammars, or the like, provided via configuration information to determine how to determine metric values or to determine which metrics to associated with a given hierarchical index record.

Also, in one or more of the various embodiments, file system engines may be arranged to subscribe to one or more internal or external services that may provide notifications if one or more metrics associated file system objects in the file system may be modified. Likewise, in some embodiments, file system engines may be arranged to subscribe to one or more internal or external services that may provide notifications if one or more file system objects in the file system may be moved, deleted, added, updated, or the like.

Accordingly, in one or more of the various embodiments, hierarchical indices may be updated based on one or more reported changes to the file system.

This block may be considered optional because in some embodiments, hierarchical indices may be provided to file system engines rather than being generated by file system engines.

At block 1106, in one or more of the various embodiments, file system engines may be arranged to monitor file system activity to determine if one or more file system objects in the file system are being updated. In one or more of the various embodiments, file system engines may be arranged to actively or passively monitor file system activity, including update activity that may occur in the file system. In some embodiments, file system engines may be arranged to provide an API, interface, or the like, that enables other services or other file system services to directly provide update information file system engines.

Likewise, in some embodiments, file system engines may be embedded or otherwise integrated with one or more file systems such that they may provide update information that is sufficient for aggregating metrics in file systems using structured journals in accordance with one or more of the various embodiments.

At block 1108, in one or more of the various embodiments, file system engines may be arranged to generate one or more structured metric journals based on updates to the file system objects in the file system. In one or more of the various embodiments, file system engines may be arranged to generate, manage, or maintain structured metric journals according to one or more policies. For example, in some embodiments, one or more data structures for structured metric journals may be pre-allocated, pre-instantiated, or built-in. In contrast, in some embodiments, file system engines may be arranged to generate structured metric journals as needed (e.g., on-the-fly). Accordingly, in some embodiments, file system engines may be arranged to employ rules, conditions, or policy information provided via configuration information to account for local circumstances or local requirements.

At decision block 1110, in one or more of the various embodiments, if an aggregate metric query may be provided, control may flow to block 1112; otherwise, file system engines may be arranged to continue normal operations. In one or more of the various embodiments, file system engines may be arranged to support one or more query providers. Accordingly, in some embodiments, query providers may be enabled to provide one or more queries that one or more results based on request metrics associated with one or more file system objects.

In one or more of the various embodiments, file system engines may be arranged to provide one or more APIs or interfaces to enable various query providers to provide one or more queries for metric information. Accordingly, in some embodiments, file system engines may be arranged to employ rules, instructions, filters, pattern matching, grammars, credentials, authentication/authorization information, or the like, provided via configuration information to enable query providers to provide query information.

At block 1112, in one or more of the various embodiments, file system engines may be arranged to provide a query result based on the one or more structured metric journals associated with one or more metrics. As described, query information provided by one or more query provider may be parsed to determine if the query may be associated one or more metrics.

Next, control may be returned to a calling process.

Figure 12:
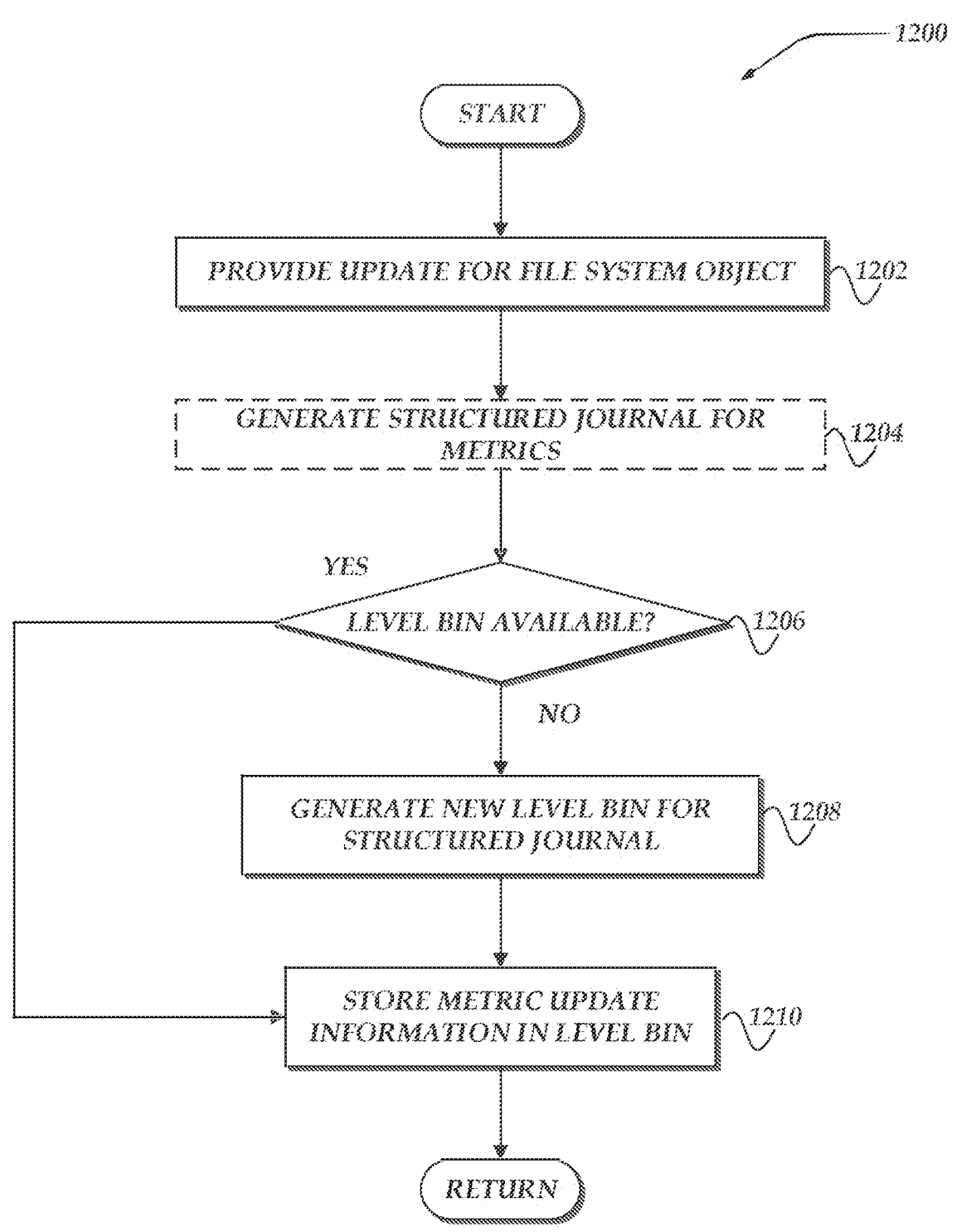
FIG. 12 illustrates a flowchart for a process for aggregating metrics in file systems using structured journals in accordance with one or more of the various embodiments.

FIG. 12 illustrates a flowchart for process 1200 for aggregating metrics in file systems using structured journals in accordance with one or more of the various embodiments. After a start block, at block 1202, in one or more of the various embodiments, one or more updates may be provided for one or more file system objects in a file system. In one or more of the various embodiments, update information associated with updates to one or more file system objects may be provided to file system engines.

At block 1204, in one or more of the various embodiments, optionally, file system engines may be arranged to generate one or more structured metric journals for one or more metrics associated with the provided updates.

In one or more of the various embodiments, file system engines may be arranged to employ the update information determine if sufficient structured metric journals may be available for the update. In some embodiments, such information may include information the file system engines may employ to determine the metrics that may be affected by the update. Thus, in some embodiments, if structured metric journals for the update are unavailable, the file system engine may generate them. In some embodiments, unassigned or unused structured metric journals may be held in a cache or queue. Accordingly, in some embodiments, file system engines may select or determine one or more structured metric journals from a cache or queue rather than generating them.

Note, this block is indicated as being optional because the necessary or sufficient structured metric journals may already be available.

At decision block 1206, in one or more of the various embodiments, if a journal level bin is available, control may flow to block 1208; otherwise, control may flow to block 1210. In some embodiments, file system engines may be arranged to employ various policies that determine if existing level bins may be employed for storing metric information associated with the update. Thus, in some cases, level bins may be included in the structured metric journals, but they may be otherwise unavailable as per the policies file system engines may be operating under. Accordingly, in some embodiments, file system engines may be arranged to employ rules, condition, or policy information provided via configuration information to account for local circumstances or local requirements.

At block 1208, in one or more of the various embodiments, file system engines may be arranged to generate one or more level bins for the one or more structured metric journals. As described above, level bins may be data structures associated with a structured metric journal. Accordingly, in one or more of the various embodiments, level bins may be comprised of one or more of arrays, lists, contiguous memory blocks, classes, objects, data types, or the like, that enable level bin records to be stored or otherwise associated with file system objects, metrics, structured metric journals, or the like.

At block 1210, in one or more of the various embodiments, file system engines may be arranged to store the metric update information in the one or more level bins. In one or more of the various embodiments, file system engines may be arranged to parse or interpret the update information to determine the metric update information that may be included level bin records. Accordingly, in some embodiments, file system engines may be arranged to generate one or more level bin records that at least include the relevant metric update information that may be stored or otherwise associated with level bins.

Next, in one or more of the various embodiments, control may be returned to a calling process.

Figure 13:
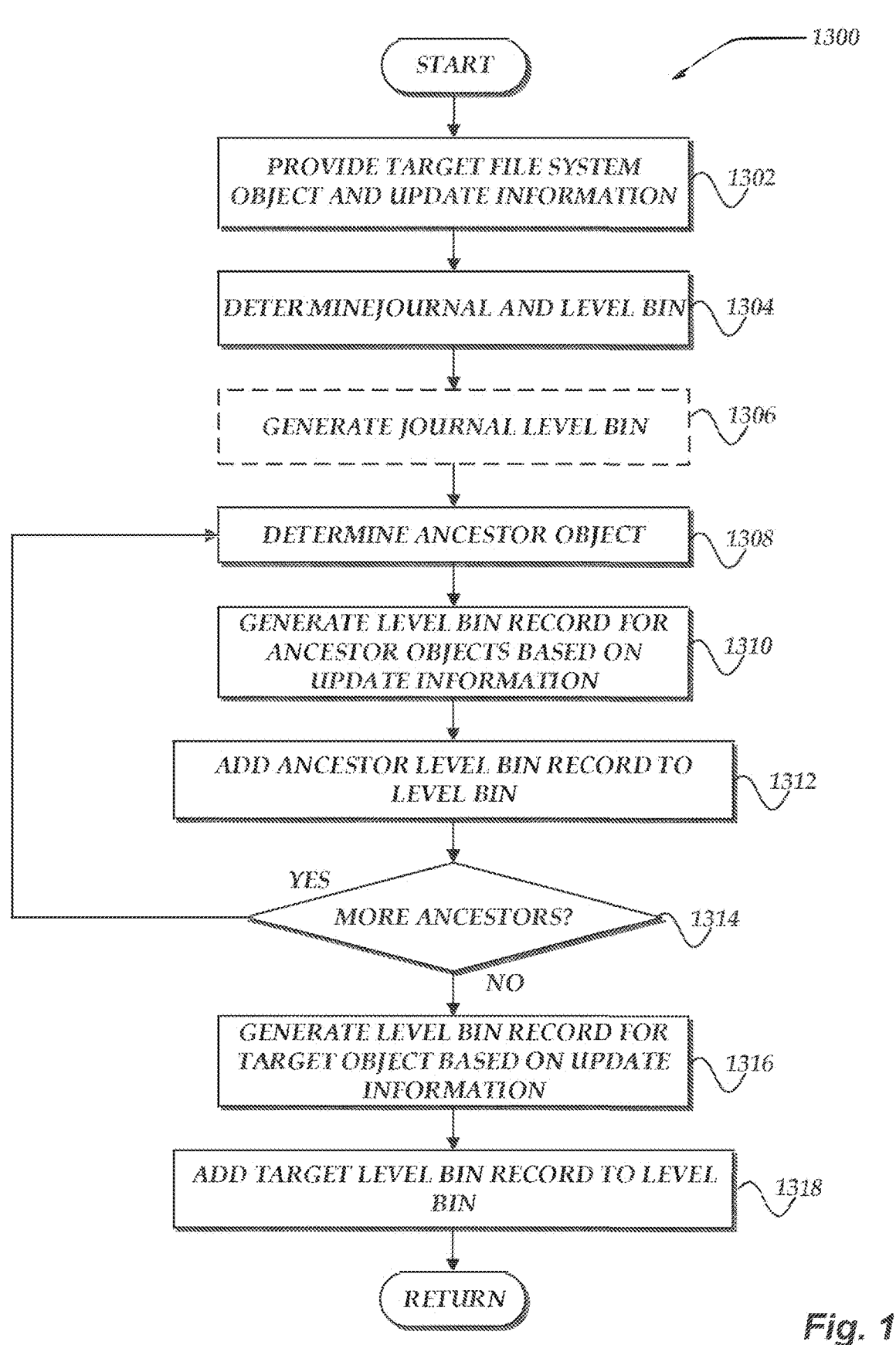
FIG. 13 illustrates a flowchart for a process for aggregating metrics for a file system object in a file system using structured journals in accordance with one or more of the various embodiments.

FIG. 13 illustrates a flowchart for process 1300 for aggregating metrics for a file system object in a file system using structured journals in accordance with one or more of the various embodiments. After a start block, at block 1302, in one or more of the various embodiments, a target file system object and update information or reference thereto may be provided to a file system engine. As described above, update information may include information about the affected file system objects, the affected metrics, the update values, change information, or the like.

At block 1304, in one or more of the various embodiments, the file system engine may be arranged to determine a structured metric journal and level bin for one or more metrics associated with the target file system object.

As described above, file system engines may be arranged to employ one or more structured metric journals dedicated to one or more metrics. Or, in some embodiments, file system engines may be arranged to employ one structured metric journals for all metrics.

Accordingly, in one or more of the various embodiments, if there may be more than one structured metric journals, file system engines may be arranged to decode the update information to determine the relevant one or more structured metric journals.

In one or more of the various embodiments, update information may include an explicit labels or other reference information that file system engines may employ to determine the updated or their associated structured metric journals.

Also, in some embodiments, file system engines may be arranged to execute one or more actions to determine the updated metrics from the update information. For example, in some embodiments, if the update information includes "CREATE FILE ID=0x34848 START=0x00AA END=0x004A . . . " the file system engine may be arranged to infer that a new file with ID=0x34848 is being added to the file system. Thus, in this example, the file system engine may be arranged to perform one or more actions to determine relevant structured metric journals, such as: determining one or more affected metrics (e.g., block count, file count, or the like); determine the metric update values; lookup the parent objects of the new files; or the like.

Accordingly, in one or more of the various embodiments, file system engines may be arranged to employ one or more rules, instructions, grammars, regular expressions, to determine structured metric journals or level bins based on the update information.

At block 1306, in one or more of the various embodiments, optionally, the file system engine may generate a new level bin in the structured metric journal associated with the one or more metrics. In some embodiments, file system engines may be arranged to determine one or more characteristics of level bins, such as, data structures, size, or (memory) locations of level bins, or the like, based on configuration information to account for local circumstances or local requirements.

Note, this block is indicated as being optional because in some circumstances, such as, batch updates, multi-object updates, near-in-time updates, or the like, existing one or more level bins may be sufficient for processing the update.

At block 1308, in one or more of the various embodiments, the file system engine may be arranged to determine one or more ancestor objects that may be associated with the target file system object being updated. As mentioned above, the update information may include information, such as, path strings, or the like, that enable the file system engine to determine the parent objects of the file system objects being updated. In some embodiments, such information may be explicitly included in the update information. Alternatively, in one or more of the various embodiments, the file system engine may be arranged to determine the parent objects based on evaluating one or more portions of the update information. For example, for some embodiments, file system engines may be arranged to lookup the parent objects based on the identity of the updated objects, At block 1310, in one or more of the various embodiments, the file system engine may be arranged to generate one or more level bin records for the one or more ancestor objects based on the update information.

In one or more of the various embodiments, update information may explicitly include the metric update information. Alternatively, in some embodiments, file system engines may be arranged to compute the metric update information from one or more portions of the update information.

Accordingly, in one or more of the various embodiments, file system engines may be arranged to employ one or more rules, instructions, grammars, regular expressions, to determine metric update information based on the update information.

In one or more of the various embodiments, file system engines may be arranged to generate level bin records that include the metric update information for the ancestor objects. In one or more of the various embodiments, the level bin record may be arranged to include information sufficient for tracking the identity of the ancestor object, the metric, and the change to the metric value. However, one of ordinary skill in the art will appreciate that the format or fields included in level bin records may vary depending on local circumstances or local requirements. Accordingly, in some embodiments, file system engines may be arranged to determine the format or fields of level bin records based on configuration information.

At block 1312, in one or more of the various embodiments, the file system engine may be arranged to add the one or more ancestor level bin records to the level bin. As described above, level bin records for the ancestor objects of the target object that are associated with the same update may be stored in the same level bin.

At decision block 1314, in one or more of the various embodiments, if there are more ancestor file system objects to process, control may loop back to block 1308; otherwise, control flow to block 1316.

At block 1316, in one or more of the various embodiments, the file system engine may be arranged to generate a level bin for the target file system object based on the update information. Similar to actions described above for ancestor objects, file system engines may be arranged to generate level bin records for the target file system object.

At block 1318, in one or more of the various embodiments, the file system engine may be arranged to add level bin records for the target file system object to the level bin. Similar to actions described above, the level bin records associated with the target object may be stored in the level bin. In some embodiments, level bin records for the target object associated with the update may be stored in the same level bin as level bin records associated with its ancestor objects that may be associated with the update.

Next, in one or more of the various embodiments, control may be returned to a calling process.

Figure 14:
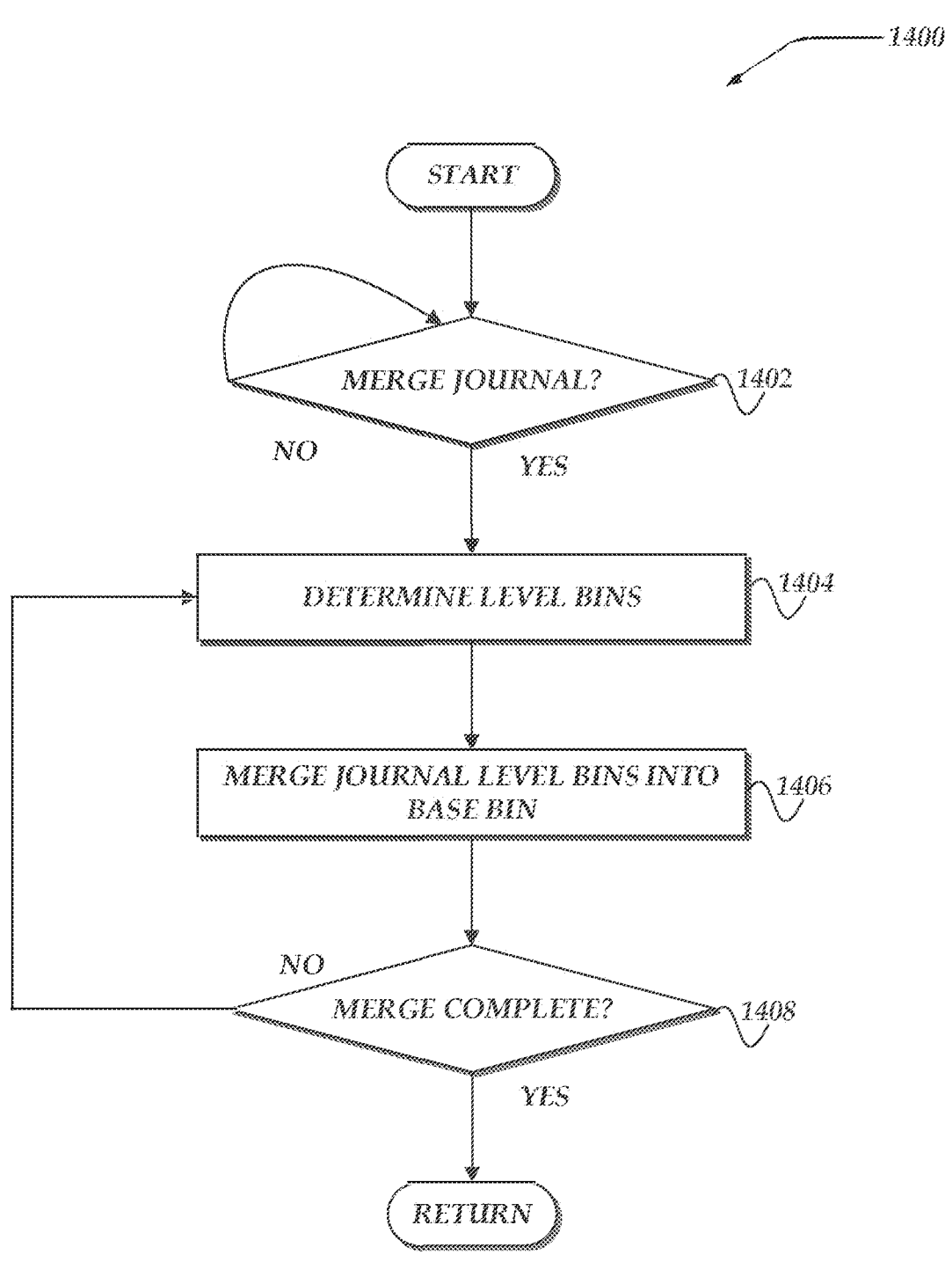
FIG. 14 illustrates a flowchart for a process for merging structured metric journals for aggregating metrics in file systems using structured journals in accordance with one or more of the various embodiments.

FIG. 14 illustrates a flowchart for process 1400 for merging structured metric journals for aggregating metrics in file systems using structured journals in accordance with one or more of the various embodiments. After a start block, at decision block 1402, in one or more of the various embodiments, if a file system engine determines a structured metric journal should be merged or compacted, control may flow to block 1404; otherwise, control may loop back to decision block 1402. As described above, in some embodiments, file system engines may be arranged to evaluate one or more rules or conditions to determine if level bins in a structured metric journal should be merged.

In one or more of the various embodiments, file system engines may be arranged to determine if a merge should be performed based on various rules or conditions based on one or more or of, timers (e.g., expiry of timers), capacity/size thresholds for structured metric journals, scheduled times, utilization the file system or structured metric journals, immediate demand (e.g., user command), or the like.

In one or more of the various embodiments, structured metric journals eligible for merging may be placed in work queues that enables file system engines to perform merging actions on structured metric journals if resources or time may be available as determined on various rules or conditions.

In one or more of the various embodiments, file system engines may be arranged to enforce different or separate merge conditions for different metrics. For example, some metrics may be modified more often than others, so they may benefit from different merging rules.

Accordingly, in one or more of the various embodiments, file system engines may be arranged to employ rules, conditions, instructions, or the like, provided via configuration information to determine if an structured metric journal should be merged.

Further, in some embodiments, some structured metric journals may not have any level bins so those structured metric journals may be excluded from merging operations because they have no level bins to merge.

At block 1404, in one or more of the various embodiments, the file system engine may be arranged to determine the one or more level bins that may be included in the structured metric journal. As described above, structured metric journals eligible for merging may include one or more level bins. Accordingly, in some embodiments, the data structures comprising structured metric journals may include references to one or more level bins. Alternatively, in some embodiments, data structures comprising structured metric journals may embed level bins directly in each structured metric journal.

At block 1406, in one or more of the various embodiments, the file system engine may be arranged to merge the level bin records in the level bins with the base bin of the structured metric journal. In one or more of the various embodiments, file system engines may be arranged to employ one or more conventional or customized merging operations, such as, merge sort, or the like, to merge level bin values into the base bin values of structured metric journals. Accordingly, in one or more of the various embodiments, file system engines may employ configuration information to determine one or more of the actions for merging level bins to account for local circumstances or local requirements.

At decision block 1408, in one or more of the various embodiments, if the merge operation may be completed, control may be returned to a calling process; otherwise, control may loop back to block 1404. In one or more of the various embodiments, if the merge operation is complete, resources associated with level bins of the structured metric journals may be freed, or otherwise released.

In one or more of the various embodiments, the particular actions employed to release the level bins may depend on the arrangement of the data structures representing the structured metric journals. For example, in some embodiments, file system engines may be free or delete the memory store associated with the merged level bins. Likewise, in other embodiments, the slots or records in merged level bins may be marked or reset to indicate that the memory for the level bin is available for re-use as a new level bin. Accordingly, in one or more of the various embodiments, file system engines may employ configuration information to determine one or more of the actions associated with merged level bins to account for local circumstances or local requirements.

Next, in one or more of the various embodiments, control may be returned to a calling process.

Figure 15:
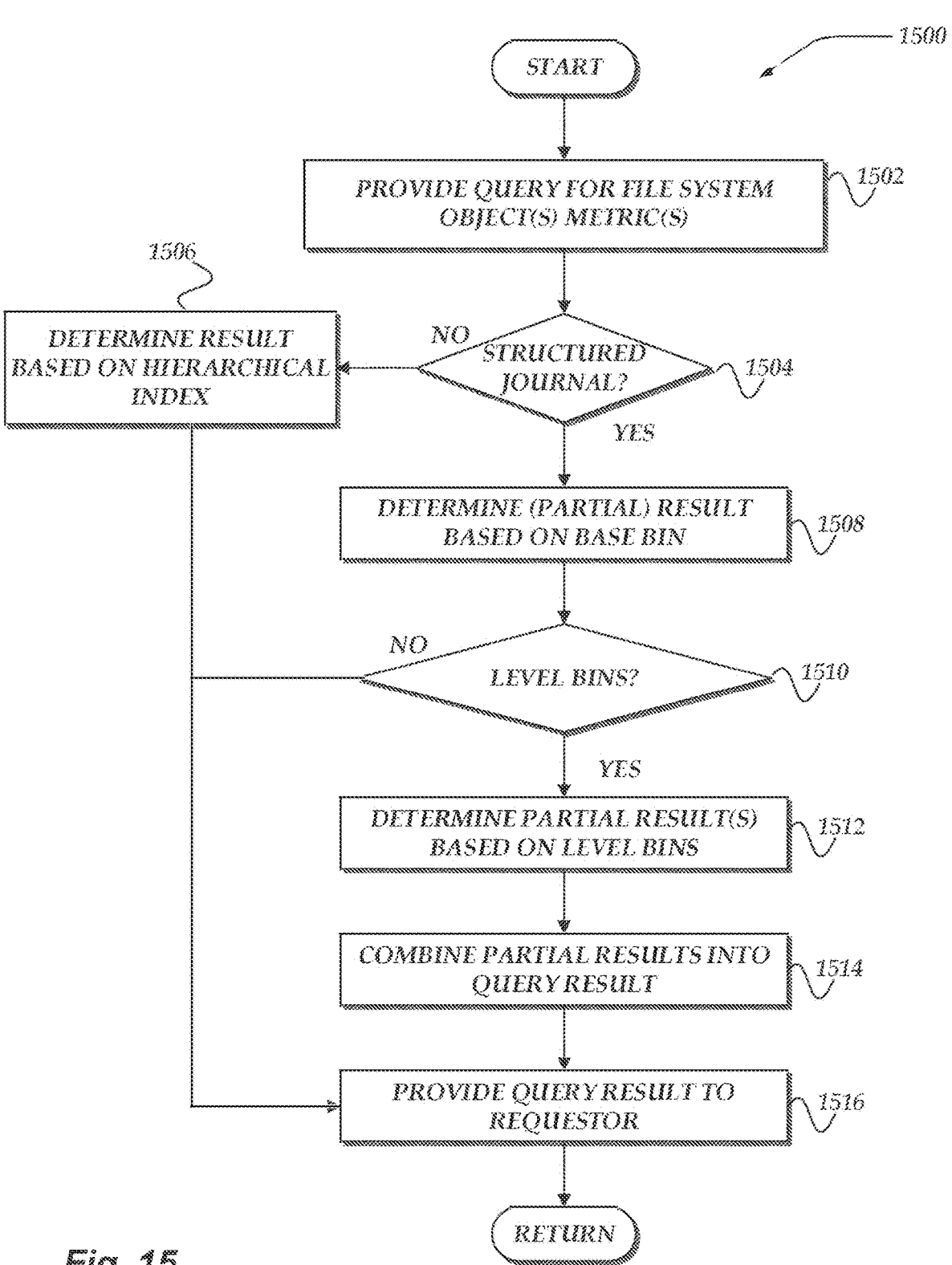
FIG. 15 illustrates a flowchart for a process for processing queries based on structured metric journals for aggregating metrics in file systems using structured journals in accordance with one or more of the various embodiments.

FIG. 15 illustrates a flowchart for process 1500 for processing queries based on structured metric journals for aggregating metrics in file systems using structured journals in accordance with one or more of the various embodiments. After a start block, at decision block 1502, in one or more of the various embodiments, one or more queries may be provided for one or more file system objects or file system metrics. In one or more of the various embodiments, one or more queries may be provided to a file system engine. In some embodiments, queries may be provided from various sources, including, remote or local command-line clients, remote or location applications, services, or the like. Accordingly, in one or more of the various embodiments, file system engines may be arranged to support one or more conventional or custom communication protocols that enable queries to be provided to file system engines. In some embodiments, queries may be provided as structured data (e.g., json, XML-RPC, or the like), strings, or the like. For example, in some embodiments, file system engines may be arranged to include a HTTP/REST API that enables users to provide query information. Accordingly, in one or more of the various embodiments, file system engines may be arranged to employ rules, instructions, grammars, or the like, provided via configuration information to determine how to interpret various query information.

At decision block 1504, in one or more of the various embodiments, if the one or more metrics associated with the query have a structured metric journal, control may flow to block 1508; otherwise, control may flow to block 1506.

In one or more of the various embodiments, the file system engine may be arranged to determine one or more structured metric journals that may be associated with the query. In one or more of the various embodiments, the file system engine may be arranged to employ query information included or associated with the query to determine the one or more metrics. For example, in some embodiments, one or more labels or tags corresponding metrics may be included in the query information. In some embodiments, file system engines may be arranged to infer one or more metrics from the query information based on the contents of the query. Accordingly, in some embodiments, if there may be structured metric journals for the one or more metrics, they may employed to process the query.

At block 1506, in one or more of the various embodiments, because structured metric journals for the one or more metrics associated with the query may be unavailable, the file system engine may be arranged to determine metric values for the query result from an alternative source, such as, a hierarchical index that includes metric values.

For example, in some embodiments, file system engines may be arranged to generate structured metric journals on demand. Accordingly, in some embodiments, in some cases, a metric of interest may not have changed such that the file system engine may not have generated a structured metric journal for the metric. Accordingly, in some embodiments, the metric value for the query result may be provided from a hierarchical index, or the like. Next, control may flow to block 1516.

At block 1508, in one or more of the various embodiments, the file system engine may be arranged to determine one or more partial results based on information included in base bins of the one or more structured metric journals. As described above, structured metric journals include at least a base bin that includes values for the metrics. Accordingly, in one or more of the various embodiments, file system engines may be arranged to determine the metric values from the base bin that correspond to the query or one or more of the file system objects referenced in the query. In some embodiments, if the structured metric journal includes level bins, the result from the base bin may be a partial result depending on the contents of the level bins. In some cases, the metric values provided from the base bin may be the final result depending on the contents of the level bins, if any.

For example, referring to structured metric journal 900 in FIG. 9, if the metric of interest in metric_0 and the query target is '/A/B/D', base bin 902A may provide the final result because level bin 904, level bin 906, and level bin 908, do not include partial results for the file system object A/B/D.

At decision block 1510, in one or more of the various embodiments, if there may be level bins associated with the one or more structured metric journals, control may flow to block 1512; otherwise, control may flow to block 1516. As described above, structured metric journals may include one or more level bins that may include update information for metrics. However, in some embodiments, a structured metric journal that has been merged prior to the query being provided may not have any level bins.

At block 1512, in one or more of the various embodiments, the file system engine may be arranged to determine one or more other partial results based on the one or more level bins. As described above, the file system engine may be arranged to accumulate or collect metric update information from one or more level bins included in a structured metric journal. In some embodiments, one or more of level bins may include update information that may represent partial results for the query.

In one or more of the various embodiments, partial results may be determined by matching path-key values associated with target file system objects and their ancestor objects. For example, referring to structured metric journal 900 in FIG. 9, if the metric of interest in metric_0 and the query target is '/A/C', level bin 904, level bin 906, and level bin 908, include partial results for the query.

At block 1512, in one or more of the various embodiments, the file system engine may be arranged to generate one or more query results based on the one or more partial results.

At block 1514, in one or more of the various embodiments, the file system engine may be arranged to provide the one or more query results to one or more clients or services that provided the one or more queries.

In one or more of the various embodiments, the results may be communicated back to the query provider using one or more conventional or custom protocols or formats that may be compatible with the query provider. Accordingly, in one or more of the various embodiments, file system engines may be arranged to employ rules, instructions, grammars, or the like, provided via configuration information to determine how to format and communicate query results to various query providers.

Next, in one or more of the various embodiments, control may be returned to a calling process.

It will be understood that each block in each flowchart illustration, and combinations of blocks in each flowchart illustration, can be implemented by computer program instructions. These program instructions may be provided to a processor to produce a machine, such that the instructions, which execute on the processor, create means for implementing the actions specified in each flowchart block or blocks. The computer program instructions may be executed by a processor to cause a series of operational steps to be performed by the processor to produce a computer-implemented process such that the instructions, which execute on the processor, provide steps for implementing the actions specified in each flowchart block or blocks. The computer program instructions may also cause at least some of the operational steps shown in the blocks of each flowchart to be performed in parallel. Moreover, some of the steps may also be performed across more than one processor, such as might arise in a multi-processor computer system. In addition, one or more blocks or combinations of blocks in each flowchart illustration may also be performed concurrently with other blocks or combinations of blocks, or even in a different sequence than illustrated without departing from the scope or spirit of the invention.

Accordingly, each block in each flowchart illustration supports combinations of means for performing the specified actions, combinations of steps for performing the specified actions and program instruction means for performing the specified actions. It will also be understood that each block in each flowchart illustration, and combinations of blocks in each flowchart illustration, can be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

The invention claimed is:

1. A method comprising:
   providing update information associated with a target object in a file system, wherein the update information is associated with a change of a value of a metric associated with the target object from an initial value of the metric associated with the target object;
   providing a journal based on the update information, wherein the journal includes a base bin that includes one or more base records, the one or more base records comprising a first column indicating a respective path-key for each object of a plurality of objects included in the file system and a second column indicating the initial value of the metric associated with the target object, the respective path-key corresponding to a respective file system path of the object;
   determining one or more objects in the file system that are different from the target object and are hierarchical ancestors in the file system for the target object based on the update information and the file system;
   generating one or more level bin records that correspond to the one or more objects, wherein each level bin record includes:
      a third column comprising the change of the value of the metric associated with the target object and the change of the value of the metric associated with the one or more objects in the file system that are hierarchical ancestors in the file system for the target object, and
      a fourth column comprising the respective path-key for each of the one or more objects;
   providing a level bin that is associated with the base bin of the journal based on the update information; and
   using the base bin and the level bin to reduce latency in generating, in response to one or more queries for the value of the metric associated with the target object or the value of the metric associated with the one or more objects, one or more query results comprising the changed value of the metric associated with the target object or the changed value of the metric associated with the one or more objects.

2. The method of claim 1, further comprising:
   storing the one or more level bin records in the level bin, wherein a sort order of the one or more level bin records in the level bin is based on an ordering of the one or more base records in the base bin.

3. The method of claim 1, wherein generating the one or more query results further comprises:
   determining a base value for each metric associated with the one or more query results based on the base bin;
   determining one or more partial values for each metric associated with the one or more query results based on the one or more level bin records; and
   generating the one or more query results based on the one or more partial values and the base value.

4. The method of claim 1, further comprising:

generating a new level bin based on one or more of the update information, an age of the one or more level bin records, or a capacity of the one or more level bin records.

5. The method of claim 1, further comprising:

providing a hierarchical index based on the file system; and generating the one or more base records in the base bin based on the hierarchical index.

6. The method of claim 1, further comprising:

determining one or more partial values associated with one or more changes to one or more metrics comprising the metric based on one or more level bins in the journal;

updating the one or more base records in the base bin based on the one or more partial values; and discarding the one or more level bins.

7. The method of claim 1, wherein the one or more base records are associated with a separate value of the metric with each object in the file system including the target object, and wherein the one or more base records are ordered based on the file system.

8. The method of claim 1, wherein each level bin comprises a hierarchical index.

9. The method of claim 8, wherein the hierarchical index comprises a fifth column indicating respective identifier attributes associated with each of the one or more objects.

10. A system, comprising:

one or more network computers, comprising:

a transceiver;

a memory that is arranged to store at least instructions; and one or more processor devices that are configured to execute the instructions, wherein the instructions are configured to cause the system to perform actions, comprising:

providing update information associated with a target object in a file system, wherein the update information is associated with a change of a value of a metric associated with the target object from an initial value of the metric associated with the target object;

providing a journal based on the update information, wherein the journal includes a base bin that includes one or more base records, the one or more base records comprising a first column indicating a respective path-key for each object of a plurality of objects included in the file system and a second column indicating the initial value of the metric associated with the target object, the respective path-key corresponding to a respective file system path of the object;

determining one or more objects in the file system that are different from the target object and are hierarchical ancestors in the file system for the target object based on the update information and the file system;

generating one or more level bin records that correspond to the one or more objects wherein each level bin record includes:

a third column comprising the change of the value of the metric associated with the target object and the change of the value of the metric associated with the one or more objects in the file system that are hierarchical ancestors in the file system for the target object, and a fourth column comprising the respective path-key for each of the one or more objects;

providing a level bin that is associated with the base bin of the journal based on the update information; and using the base bin and the level bin to reduce latency in generating, in response to one or more queries for the value of the metric associated with the target object or the value of the metric associated with the one or more objects, one or more query results comprising the changed value of the metric associated with the target object or the changed value of the metric associated with the one or more objects.

11. The system of claim 10, wherein the instructions are further configured to cause the system to perform further actions, comprising:

storing the one or more level bin records in the level bin, wherein a sort order of the one or more level bin records in the level bin is based on an ordering of the one or more base records in the base bin.

12. The system of claim 10, wherein the instructions are further configured to cause the system to perform further actions, comprising:

determining a base value for each metric associated with the one or more query results based on the base bin;

determining one or more partial values for each metric associated with the one or more query results based on the one or more level bin records; and generating the one or more query results based on the one or more partial values and the base value.

13. The system of claim 10, wherein the instructions are further configured to cause the system to perform further actions, comprising:

generating a new level bin based on one or more of the update information, an age of the one or more level bin records, or a capacity of the one or more level bin records.

14. The system of claim 10, wherein the instructions are further configured to cause the system to perform further actions, comprising:

providing a hierarchical index based on the file system; and generating the one or more base records in the base bin based on the hierarchical index.

15. The system of claim 10, wherein the instructions are further configured to cause the system to perform further actions, comprising:

determining one or more partial values associated with one or more changes to one or more metrics comprising the metric based on one or more level bins in the journal;

updating the one or more base records in the base bin based on the one or more partial values; and discarding the one or more level bins.

16. The system of claim 10, wherein the one or more base records are associated with a separate value of the metric with each object in the file system including the target object, and wherein the one or more base records are ordered based on the file system.

17. A non-transitory computer-readable medium storing code, the code comprising instructions executable by a processor to:

provide update information associated with a target object in a file system, wherein the update information is associated with a change of a value of a metric associated with the target object from an initial value of the metric associated with the target object;

provide a journal based on the update information, wherein the journal includes a base bin that includes one or more base records, the one or more base records comprising a first column indicating a respective path-key for each object of a plurality of objects included in the file system and a second column indicating the initial value of the metric associated with the target object, the respective path-key corresponding to a respective file system path of the object;

determine one or more objects in the file system that are different from the target object and are hierarchical ancestors in the file system for the target object based on the update information and the file system;

generate one or more level bin records that correspond to the one or more objects, wherein each level bin record includes:

a third column comprising the change of the value of the metric associated with the target object and the change of the value of the metric associated with the one or more objects in the file system that are hierarchical ancestors in the file system for the target object, and a fourth column comprising the respective path-key for each of the one or more objects;

provide a level bin that is associated with the base bin of the journal based on the update information; and use the base bin and the level bin to reduce latency in generating, in response to one or more queries for the value of the metric associated with the target object or the value of the metric associated with the one or more objects, one or more query results comprising the changed value of the metric associated with the target object or the changed value of the metric associated with the one or more objects.

18. The non-transitory computer-readable medium of claim 17, wherein the instructions are further executable by the processor to:

store the one or more level bin records in the level bin, wherein a sort order of the one or more level bin records in the level bin is based on an ordering of the one or more base records in the base bin.

19. The non-transitory computer-readable medium of claim 17, wherein the instructions are further executable by the processor to:

determine a base value for each metric associated with the one or more query results based on the base bin;

determine one or more partial values for each metric associated with the one or more query results based on the one or more level bin records; and generate the one or more query results based on the one or more partial values and the base value.

20. The non-transitory computer-readable medium of claim 17, wherein the instructions are further executable by the processor to:

generate a new level bin based on one or more of the update information, an age of the one or more level bin records, or a capacity of the one or more level bin records.

\* \* \* \* \*